(12) United States Patent
Buss

(10) Patent No.: US 9,891,666 B2
(45) Date of Patent: Feb. 13, 2018

(54) APPARATUS WITH TWISTABLE ELECTRONICS DOCK AND ROTATABLE CONNECTING PORT HAVING A PLURALITY OF HEADS

(71) Applicant: Scott Anthony Buss, Waukesha, WI (US)

(72) Inventor: Scott Anthony Buss, Waukesha, WI (US)

( * ) Notice: Subject to any disclaimer, the term of this patent is extended or adjusted under 35 U.S.C. 154(b) by 0 days.

(21) Appl. No.: 15/143,002

(22) Filed: Apr. 29, 2016

(65) Prior Publication Data

US 2016/0320801 A1 Nov. 3, 2016

Related U.S. Application Data

(60) Provisional application No. 62/155,088, filed on Apr. 30, 2015.

(51) Int. Cl.
| | |
|---|---|
| *G06F 1/16* | (2006.01) |
| *H02J 7/00* | (2006.01) |
| *F16M 13/00* | (2006.01) |
| *G04G 17/08* | (2006.01) |
| *G04G 19/00* | (2006.01) |
| *H01R 13/631* | (2006.01) |
| *H04S 7/00* | (2006.01) |

(52) U.S. Cl.
CPC ........... *G06F 1/1632* (2013.01); *F16M 13/00* (2013.01); *G04G 17/086* (2013.01); *G04G 19/00* (2013.01); *G06F 1/1626* (2013.01); *G06F 1/1649* (2013.01); *G06F 1/1679* (2013.01); *H01R 13/6315* (2013.01); *H02J 7/0042* (2013.01); *H04S 7/00* (2013.01); *H04R 2205/021* (2013.01); *H04S 2420/01* (2013.01)

(58) Field of Classification Search
CPC ..... G06F 1/1632; G06F 1/1633; G06F 1/1684
See application file for complete search history.

(56) References Cited

U.S. PATENT DOCUMENTS

| | | | |
|---|---|---|---|
| 5,648,712 A | 7/1997 | Hahn | |
| 6,126,460 A * | 10/2000 | Wu | H01R 27/00 439/131 |
| 6,275,376 B1 | 8/2001 | Moon | |

(Continued)

OTHER PUBLICATIONS

Logotech, Universal Phone Charger and USB Flash Drive, http://www.logotech.com/universal-phone-charger-and-usb-flash-drive-phac637.html, 2 pages as viewed on Mar. 20, 2015.

*Primary Examiner* — Anthony Q Edwards
(74) *Attorney, Agent, or Firm* — Brannen Law Office, LLC

(57) ABSTRACT

The present invention relates to an apparatus such as a clock with an electronics dock that is twistable relative to a body and with a rotatable connecting port having a plurality of heads. The body has a top generally lying in a plane, a first face with a display and a second face with a display. An electronics dock is secured relative to the body in a twistable manner relative to the body top. In this regard, an electronic device held within the electronics dock can be selectively rotated for viewing about an axis that is generally perpendicular to the body top. Further, a connecting port with multiple charging heads is provided, such as for Android or Apple type devices. The connecting port can be rotated about an axis to allow access to the desired head. A lock is provided to hold the desired head in position for use.

16 Claims, 24 Drawing Sheets

(56) References Cited

U.S. PATENT DOCUMENTS

| | | |
|---|---|---|
| D452,164 S | 12/2001 | Buss |
| D486,788 S | 2/2004 | Riede |
| 6,716,058 B2 | 4/2004 | Youn |
| 7,011,538 B2 | 3/2006 | Chang |
| 7,457,204 B1 * | 11/2008 | Winters ................ G04G 13/02 368/10 |
| 7,524,197 B2 * | 4/2009 | Mills .................... G06F 1/1632 381/334 |
| 7,549,877 B1 * | 6/2009 | Vista, Jr. ............ H01R 13/6675 439/172 |
| 7,567,431 B2 * | 7/2009 | Brooks, Jr. ...... G07B 17/00193 235/462.43 |
| 7,693,009 B2 | 4/2010 | Buss |
| 7,738,238 B2 | 6/2010 | Liu |
| 7,808,779 B2 | 10/2010 | Lum et al. |
| D628,091 S * | 11/2010 | Bulsink ......................... D10/14 |
| 7,923,964 B2 * | 4/2011 | Lin ..................... H02J 7/0044 320/107 |
| D647,409 S * | 10/2011 | Bulsink ......................... D10/14 |
| 8,145,821 B2 * | 3/2012 | Mead ................... G06F 1/1632 361/679.41 |
| 8,159,818 B2 * | 4/2012 | Riddiford ........... B60R 11/0258 312/223.1 |
| 8,355,690 B2 * | 1/2013 | Krampf ................ H03J 1/0025 381/334 |
| 8,391,014 B2 * | 3/2013 | Sung .................... G06F 1/1632 361/212 |
| 8,422,206 B2 | 4/2013 | Fu et al. |
| 8,491,317 B2 | 7/2013 | Vardanyan |
| 8,780,548 B2 | 7/2014 | Lee |
| 8,971,563 B2 | 3/2015 | Zhou et al. |
| 2006/0098116 A1 | 5/2006 | Manico et al. |
| 2007/0035917 A1 | 2/2007 | Hotelling et al. |
| 2008/0266783 A1 * | 10/2008 | Mills ..................... G06F 1/1632 361/679.44 |
| 2009/0321483 A1 | 12/2009 | Froloff |
| 2010/0062615 A1 * | 3/2010 | Prest ..................... H01R 35/00 439/38 |
| 2011/0170256 A1 | 7/2011 | Lee |
| 2011/0267929 A1 * | 11/2011 | Ishakis ................ G04G 17/086 368/228 |
| 2012/0014056 A1 * | 1/2012 | Chen ..................... F16M 11/08 361/679.41 |
| 2012/0187902 A1 | 7/2012 | Wang |
| 2012/0212177 A1 | 8/2012 | Peacock et al. |
| 2013/0005179 A1 | 1/2013 | Aldana et al. |
| 2013/0241489 A1 | 9/2013 | Ting |
| 2013/0320913 A1 | 12/2013 | Chen |
| 2013/0336510 A1 * | 12/2013 | Lee ....................... G06F 1/1632 381/333 |
| 2013/0342638 A1 | 12/2013 | Sobti et al. |
| 2013/0344705 A1 | 12/2013 | Mikhnenko |
| 2014/0235082 A1 * | 8/2014 | Adachi ................ H01R 35/025 439/164 |
| 2014/0268542 A1 * | 9/2014 | Moon ................... G06F 1/1632 361/679.41 |
| 2014/0361751 A1 * | 12/2014 | Strauser ................. G06F 1/266 320/137 |
| 2015/0024625 A1 * | 1/2015 | Hsieh ..................... H01R 35/04 439/540.1 |
| 2015/0185773 A1 * | 7/2015 | Vroom ................. G06F 1/1632 361/679.41 |
| 2015/0248141 A1 * | 9/2015 | Singleton ............. H02J 7/0044 361/679.41 |

\* cited by examiner

APPARATUS WITH TWISTABLE ELECTRONICS DOCK AND ROTATABLE CONNECTING PORT HAVING A PLURALITY OF HEADS

This patent application claims priority on and the benefit of provisional application 62/155,088 filed Apr. 30, 2015, the entire contents of which are hereby incorporated herein by reference.

BACKGROUND OF THE INVENTION

1. Field of the Invention

The present invention relates to an apparatus such as a clock with twistable electronics dock and rotatable connecting port having a plurality of heads.

2. Description of the Related Art

Many products have been developed over the years. Some examples include:

United States Patent Application Publication 2012/0187902 to Wang is titled Portable Battery Charger. It shows a portable battery charger that has a built-in, retractable connector for charging a portable electronic device. In a first position, a first connector is exposed to the outside of the portable battery charger, to be inserted into a power supply apparatus for charging a reserve battery in the portable battery charger. In a second position, a second connector is exposed to the outside of the portable battery charger, to be inserted into a portable electronic device for charging the portable electronic device. In a third position, both the first and second connectors are covered in the case of the portable battery charger.

United States Patent Application Publication 2013/0241489 to Ting is titled Cell Phone Docking Charger. It discloses a cell phone docking charge that is used on a wall receptacle. To improve an existing cell phone docking charger that requires a transmission line, a cell phone recharge connector and a charging unit of the present invention are combined. The recharge connector and an AC plug are rotatable separately and can be rotated out for containing, so as to facilitate carrying by a user. The recharge connector is equipped with plural types and can be rotated open at various angles.

United States Patent Application Publication 2013/0320913 to Chen is titled Mobile Charger Device. It shows a mobile charger device including a first connector that electrically connects a first mobile device to the mobile charger device, a second connector that electrically connects a second mobile device to the mobile charger device, a connector element that electrically connects the first mobile device electrically connected by the first connector with the second mobile device electrically connected by the second connector, and a switch operable to select which one of the first and second mobile devices supplies power through the connector element to the other of the first and second mobile devices.

United States Patent Application Publication 2013/0344705 to Mikhnenko is titled Electrical Connector. It related to electrical connectors, and devices including electrical connectors. There is provided an electrical connector composite comprising a first electrical connector and a second electrical connector, the electrical connector composite mountable in a device and providing an electrical connection to the device, the electrical connector composite rotatable with respect to the device when mounted in the device, the electrical connector composite rotatable to present the first electrical connector in an electrically connectable configuration, and the electrical connector composite rotatable to present the second electrical connector in an electrically connectable configuration.

U.S. Pat. No. 6,716,058 to Youn is titled Cradle Device of Portable Terminal. It shows a cradle device of a portable terminal such as a PDA (personal digital assistance). The cradle device of the portable terminal has a cradle body on which the portable terminal is placed; and a holder to embrace the portable terminal settled on the cradle body. The holder is rotatable with respect to the cradle body within a predetermined angular range. A bracket hinge is settled at the cradle body, and a bracket shaft is settled at the holder. A friction member is disposed between the bracket hinge and the bracket shaft with a predetermined friction force. Accordingly, an angle of the holder can be freely adjusted when the portable terminal is embraced by the holder.

U.S. Pat. No. 7,738,238 to Liu is titled Portable Audio/Video Playing Device Disposing Structure. It shows a portable audio/video device disposing structure includes: a base having a recession disposed on a surface of the base; a carrying unit movably coupled with the recession of the base and having a disposing portion disposed on a surface of the carrying unit, a latch element disposed at an end of the disposing portion, and an indentation disposed on both sides of the disposing portion separately; and a contractible unit with both ends coupled to the base and the carrying unit respectively. The portable audio/video device is installed on the carrying unit in conformity with the base and the contractible unit to achieve the effects of adjusting the portable audio/video device to any angle and disposing the portable audio/video device in any position.

U.S. Pat. No. 7,808,779 to Lum et al. is titled Rotatable Dock for Portable Electronic Devices. It shows a docking system for supporting a portable electronic device with a vertical operational orientation and a horizontal operational orientation is disclosed. The docking system includes a base stand unit that has a flat top surface. Additionally, there is a device support platform that is rotatably mounted to the base stand unit. The device support platform defines a cradle portion that is engageable to the portable electronic device. The device support platform has a first position corresponding to the vertical operational orientation, and a second position corresponding to the horizontal operational orientation.

U.S. Pat. No. 8,422,206 to Fu et al. is titled Consumer Electronic Product Assembly with Bracket. It shows a consumer electronic product assembly includes a consumer electronic product and a bracket holding the consumer electronic product. The bracket includes a supporting seat, a holding member and a connecting bar. The holding member holds the consumer electronic product. Opposite ends of the connecting bar hinge on the holding member and the supporting seat, respectively. The connecting bar is rotatable with respect to the supporting seat, and the holding member is rotatable with respect to the connecting bar, whereby the consumer electronic product held by the holding member can be adjusted to various positions with respect to the supporting seat.

U.S. Pat. No. 8,780,548 to Lee is titled Docking Station with Rotation Mechanism. It shows that a docking station for a portable electronic device is provided. The docking station comprises (a) an engagement element, wherein the engagement element is capable of engaging the said portable electronic device; and (b) a rotation mechanism, wherein the rotation mechanism is capable of rotating said portable electronic device relative to a support base of said docking station.

U.S. Pat. No. 8,971,563 to Zhou et al. is titled Docking Station for Electronic Device. It shows a docking station that includes a main body, a supporting arm projecting from the main body, and a rotating member rotatably coupled to the supporting arm and retaining the electronic device. The rotating member is capable of rotating from a first position to a second position different from the first position, when the rotating member rotates to the first position, the electronic device is supported in a first orientation, and when the rotating member rotates to the second position, the electronic device is supported in a second orientation.

United States Patent Application Publication 2007/0035917 to Hotelling et al. is titled Methods and Apparatuses for Docking a Portable Electronic Device that has a Planar Like Configuration and that Operates in Multiple Orientations. It shows a docking system that includes a portable electronic device capable of operating in multiple orientations including vertical and horizontal. The docking system also includes a docking station configured to mechanically accept and operatively interface with the portable electronic device in any of its multiple orientations including vertical and horizontal.

While the products shown in each of these patents and published applications may work well for their intended purposes, none solve all of the problems that are solved by the present invention.

Thus there exists a need for an apparatus such as a clock that solves these and other problems.

SUMMARY OF THE INVENTION

The present invention relates to an apparatus such as a clock with an electronics dock that is twistable relative to a body and with a rotatable connecting port having a plurality of heads. The body has a top generally lying in a plane, a first face with a display and a second face with a display. An electronics dock is secured relative to the body in a twistable manner relative to the body top. In this regard, an electronic device held within the electronics dock can be selectively rotated for viewing about an axis that is generally perpendicular to the body top. Further, a connecting port with multiple charging heads is provided, such as for Android or Apple type devices. The connecting port can be rotated about an axis to allow access to the desired head. A lock is provided to hold the desired head in position for use.

According to one advantage of the present invention, a connecting port with multiple heads is provided. In this regard, the apparatus could be used with Android, Apple or other type or brands of devices. The connecting port allows the device to charge and/or communicate with the clock or base.

According to another advantage of the present invention, the connecting port can be manipulated and positioned whereby the appropriate charging head is accessible to the user.

According to a further advantage of the present invention, the accessible connecting head is oriented generally parallel to a back or back plate. The back plate can have a slight rearward angle to aid in positioning the docked device to an appropriate viewing angle relative to a horizontal plane.

According to a further advantage of the present invention, the inaccessible head is stowed. In one embodiment, when a first head is accessible, the second head is stored within the body. Then, when the second head is accessible, the first head is stored behind the back plate.

According to a still further advantage of the present invention, the connecting port is rotatable upon an axis that is generally parallel to a plane of the body top. A lock is provided in order to secure the port to the desired rotational position whereby an electronic device is used in the intended display position regardless of the used charging head.

According to a still further advantage yet of an embodiment of the present invention, the lock cradles the connecting port. The cradling of the port secures the port from rotational movement in both rotational directions.

According to another advantage of an embodiment of the present invention, the connecting port could have three heads, two of which are designed for a similar type device but operative in opposite orientations (so that the front or rear of the device is viewable).

According to yet another advantage of the present invention, the axis of rotation of the connecting port could be changed.

According to a still further advantage of the present invention, the electronics dock is twistable or rotatable relative to the top of the body. In this regard, the viewing angle of the electronic device relative the front face of the body can be selected by the user. The advantageously could allow the device to be properly positioned for a video connecting or to otherwise see what is displayed on the face of the device (who is calling, what song is being played, etc.).

According to a still further advantage yet of the present invention, the electronics dock is rotatable relative to the body about an axis that is generally perpendicular to the plane of the body top (or to another surface that is generally horizontal).

In a specific example wherein the body is a clock with two clock displays on different faces, the viewing angle can be aligned with either of the displays, or with any desired angle there between. This could be advantageous in a hotel environment wherein the clock is located between two beds.

According to an advantage of an embodiment of the present invention, a plunger can be depressed when a phone is docked, wherein depression of the plunger automatically locks the dock so the heads cannot rotate. This advantageously provided stability to the electronics dock with an electronic device is secured to a head (as the head is not movable), thereby preventing damage to the dock and the device.

According to further a further advantage of the present invention, a switch is provided for moving or toggling between the heads. The switch is operable when no device is docked, and is inoperable when a device is docked.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
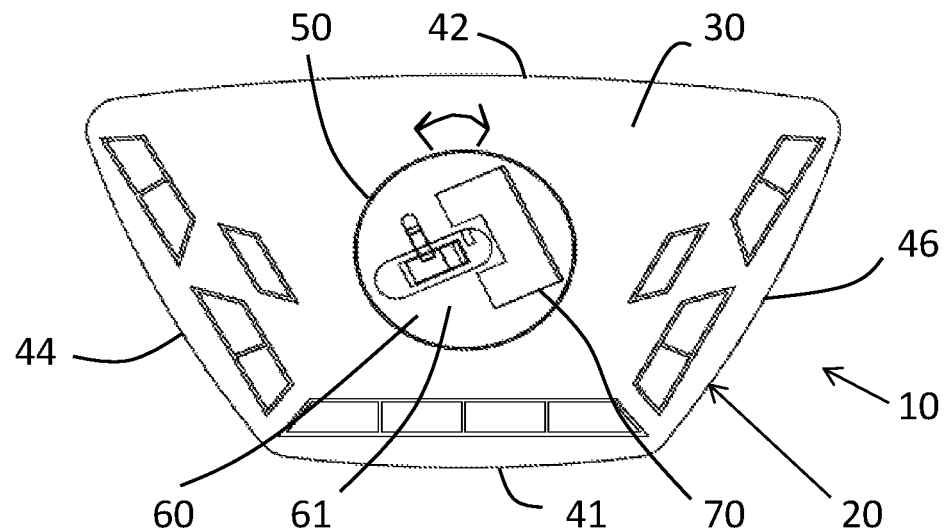
FIG. 1 is a top view of an embodiment of the present invention showing an electronics dock in a first exemplary angular position.
Figure 2:
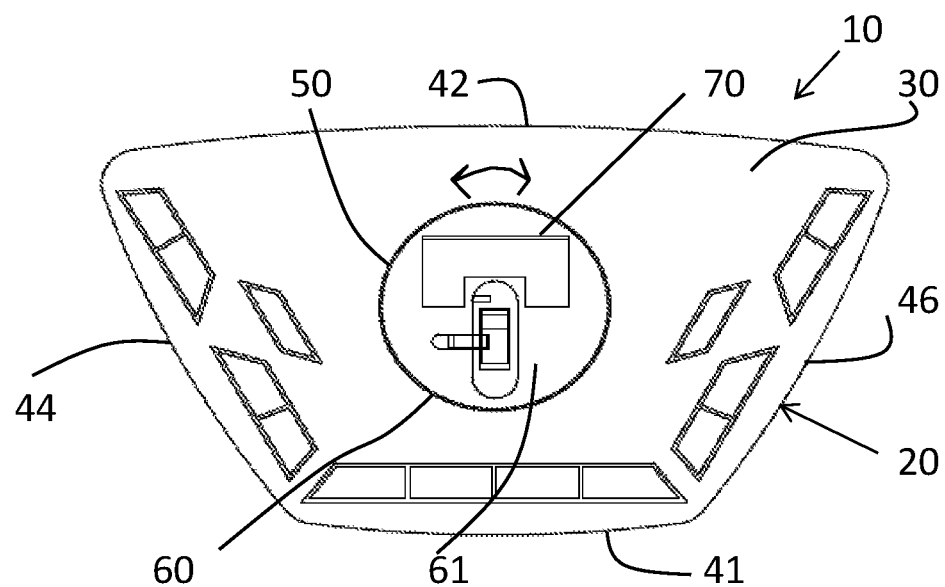
FIG. 2 is similar to FIG. 1, but shows the electronics dock in a second exemplary angular position.
Figure 3:
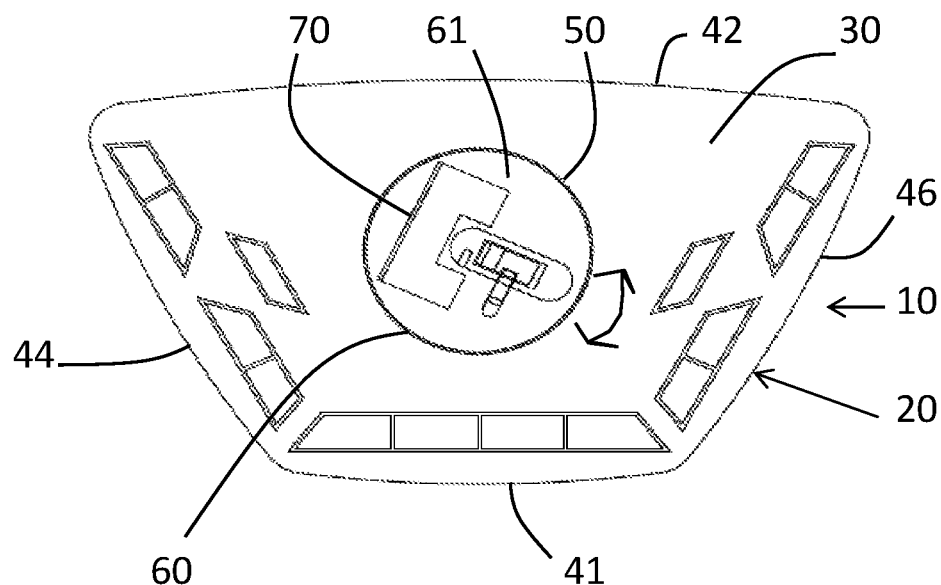
FIG. 3 is similar to FIG. 1, but shows the electronics dock in a third exemplary angular position.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

A preferred embodiment of the present invention is illustrated in FIGS. 1-16. It is understood that while a preferred embodiment is illustrated, that the present invention is not limited to the illustrated embodiments.

The present invention has an apparatus 10 such as a clock. It is appreciated that the apparatus could be an item other than a clock without departing from the broad aspects of the present invention. For example, the device could be a music docking station, a station for an e-reader, a printer or a station for another type of device without departing from the broad aspects of the present invention. All necessary internal electronics are provided, such as wiring and processors.

An electronic device 5 having a viewable face 6 is provided and can be used with the present invention. Two exemplary devices are Apple and Android brand phones. Of course, other devices (e.g. e-readers, music players, tablets, etc.) could alternatively or additionally be used. Each electronic device can have a different sized connecting receptacle. The present invention is designed to accommodate multiple types of devices. The device can be electrically connected to the apparatus via the connecting port.

The clock or base station 10 has a body 20. The body 20 has a top 30 with a hole 31 having a rim 32 and lip 33. The Top 30 is preferably generally planar and lies in a top plane 35. The clock body 20 further has a bottom 40, a front 41, a rear 42, a first face 44 with a display 45, and a second face 46 with a display 47. The displays are preferably similar in that the same information can be displayed on each face. The displays can be angled relative to the front and rear of the body a similar amount. It is appreciated that there could be more or fewer displays without departing from the broad aspects of the present invention. Ring 32 and lip 33 are generally circular in outer profile. Lip 33 depends from the top inwards towards the interior of the body.

Figure 9:
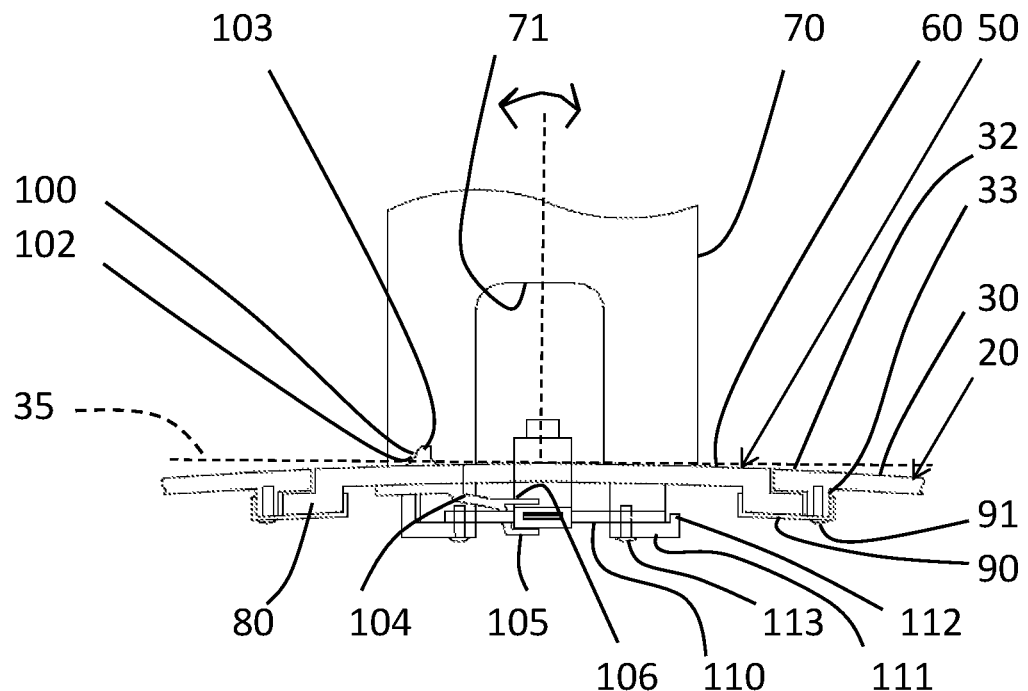
FIG. 9 is a front view showing a connecting head cradled by a lock.
Figure 9A:
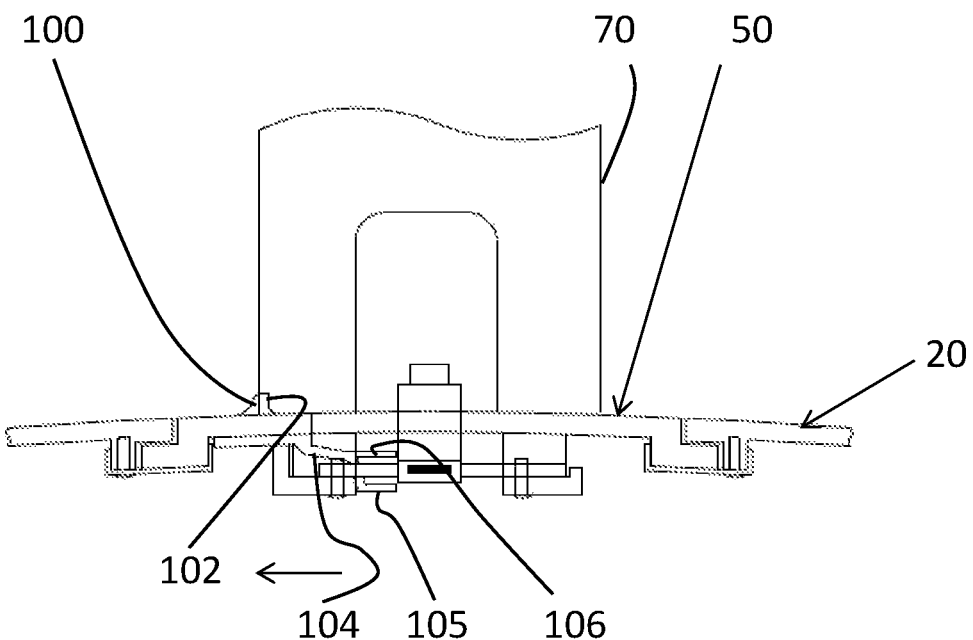
FIG. 9A is similar to FIG. 9, but shows the lock in an unlocked position.
Figure 10:
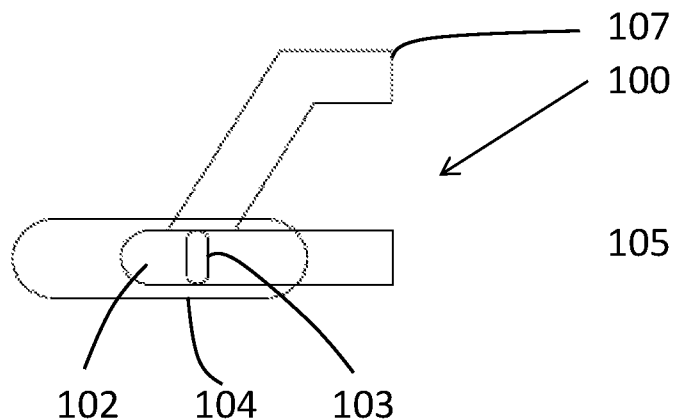
FIG. 10 is a top view of a preferred embodiment of a lock of the present invention.
Figure 11:
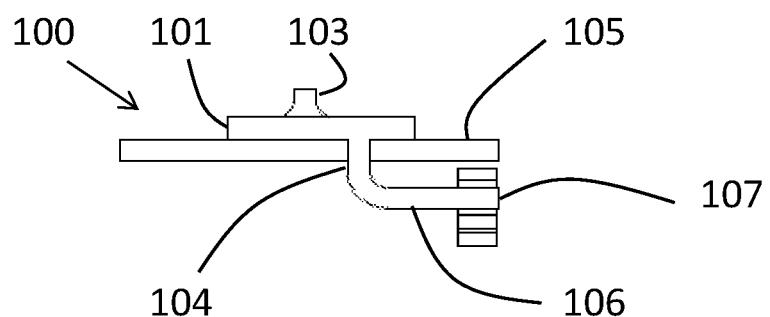
FIG. 11 is a front view of the lock shown in FIG. 10.
Figure 12:
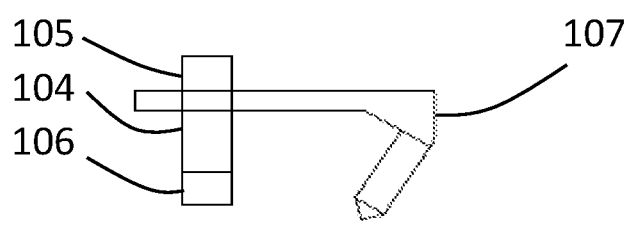
FIG. 12 is a side view of the lock shown in FIG. 10.
Figure 13:
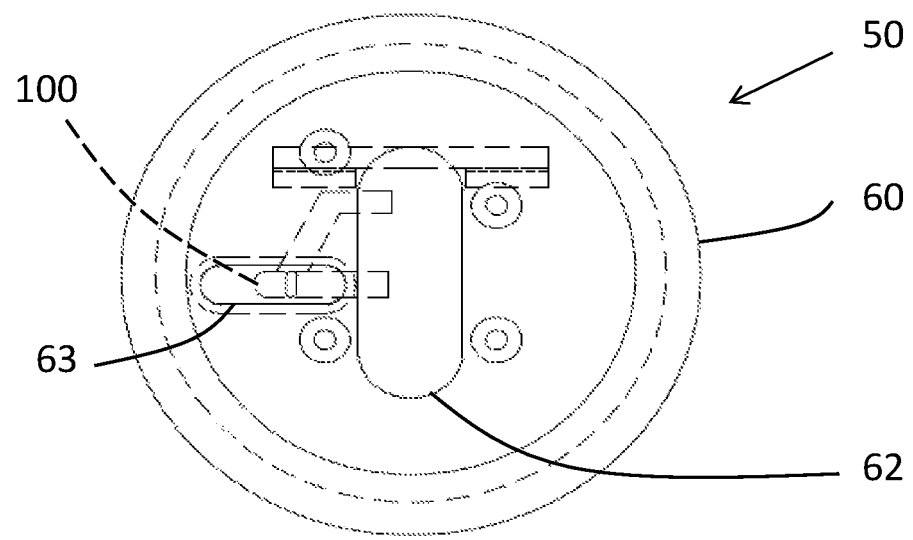
FIG. 13 is a bottom view of the electronics dock shown in FIG. 9
Figure 14:
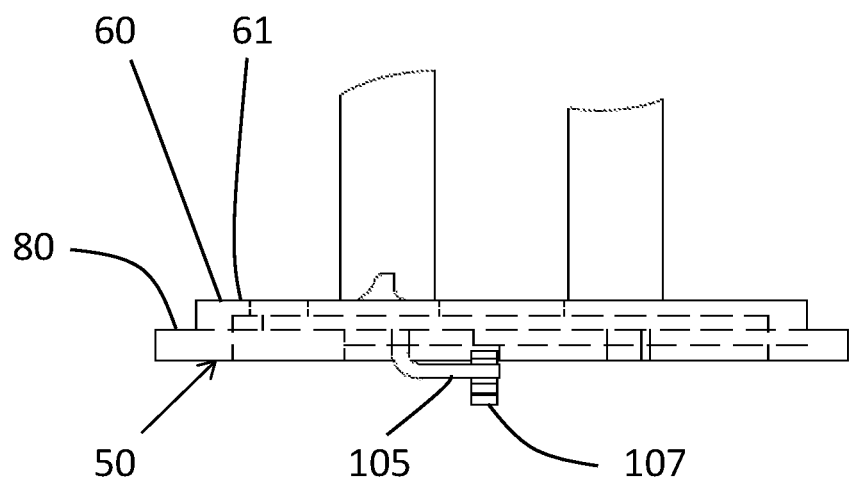
FIG. 14 is a front view of FIG. 13.
Figure 15:
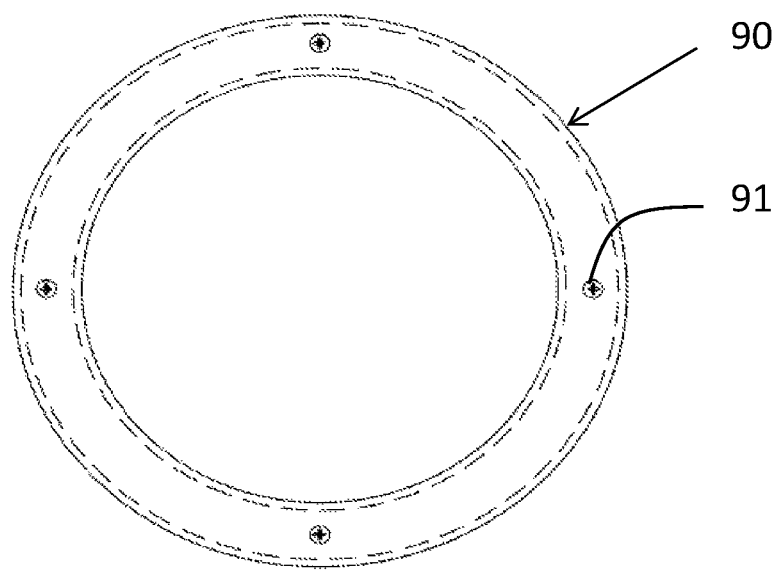
FIG. 15 is a top view of a retainer.
Figure 16:
FIG. 16 is a side view of the retainer shown in FIG. 15.
Figure 17:
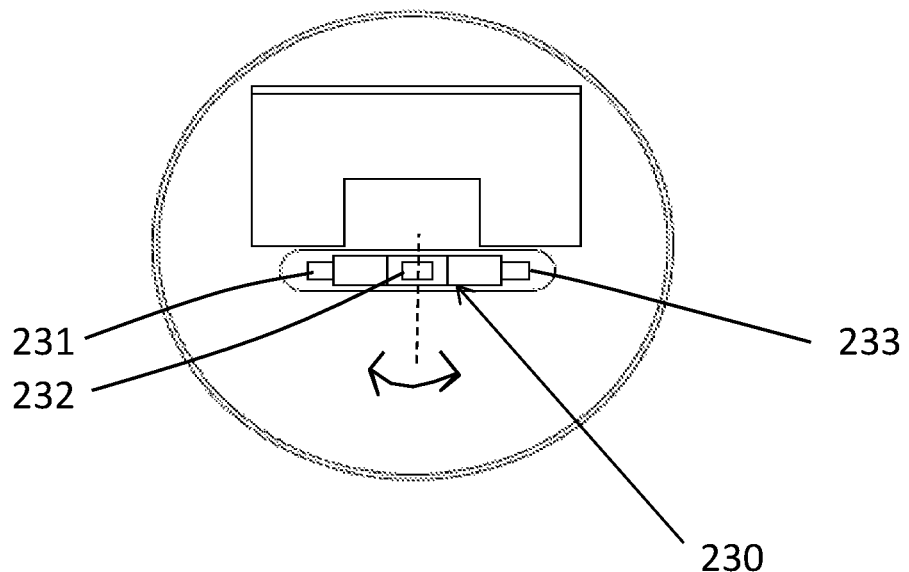
FIG. 17 is a top view of an alternative connecting port of the present invention operable along an alternative rotation axis.
Figure 18:
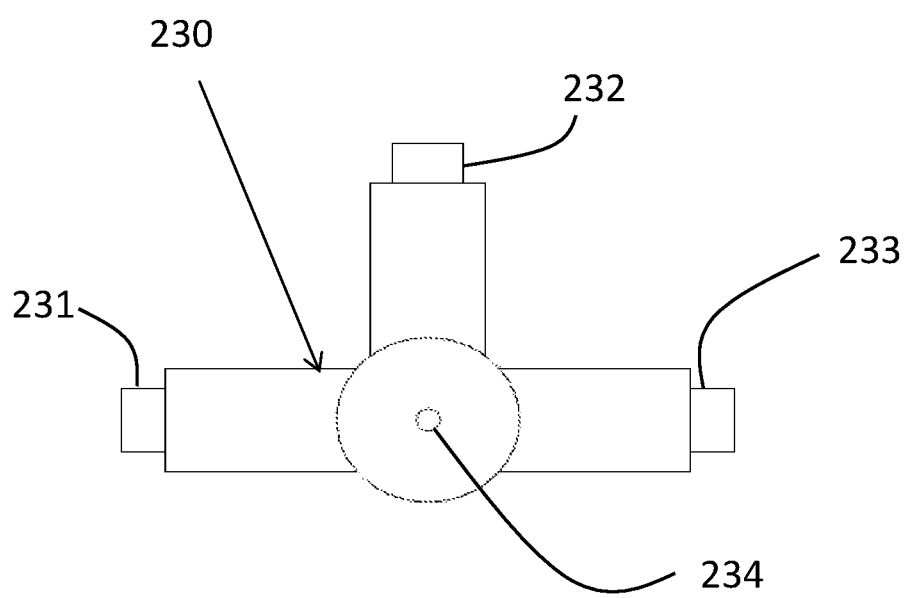
FIG. 18 is a side view of the connecting port shown in FIG. 17.
Figure 19:
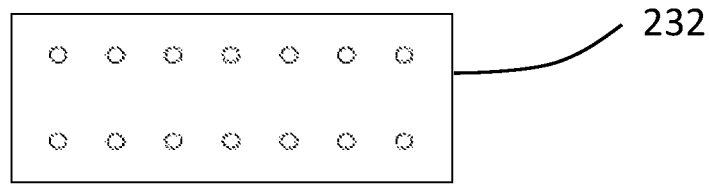
FIG. 19 is an end view of one of the three heads shown in FIG. 18.
Figure 20:
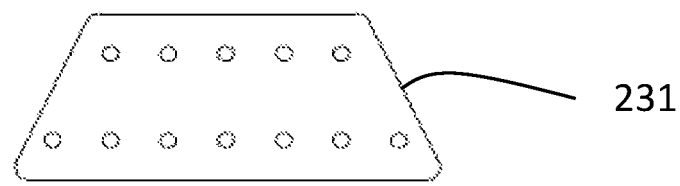
FIG. 20 is an end view of one of the three heads shown in FIG. 18.
Figure 21:
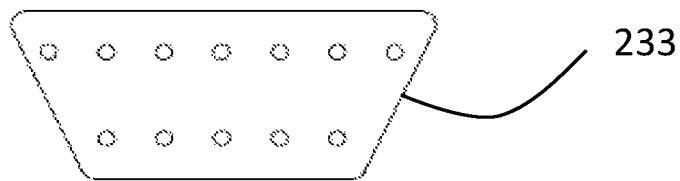
FIG. 21 is an end view of one of the three heads shown in FIG. 18.

An electronics dock 50 is further provided. The dock 50 has a base 60 with an upper surface 61. A charger or connector opening 62 and a lock opening 63 pass through the base 60. A back support 70 (or simply back) is generally upstanding from the surface 61. The back support 70 is preferably reclined a few degrees from vertical. It is appreciated that it could be completely vertical without departing from the broad aspects of the present invention. An opening 71 passes through the back at the base of the back. The opening is preferably generally centrally laterally located on the base. The base 60 further has a ring 80 radially extending outwardly in a circular manner below the surface 61 of the base 60. Ring 80 has a circular outer perimeter. A retainer 90, having two spaced walls, and screws 91 are provided for securing the electronics dock 50 to the top 30 of the body 20 as seen in FIGS. 9 and 9A. In this regard, the ring 80 is adjacent the lip 33 when held by the retainer 90 between the two spaced walls. The retainer 90 is preferably secured with screws to the lip 33 so that the base is free to twist or rotate relative to the lip 33 and accordingly relative to the body 20.

While screws are illustrated in the preferred embodiment, it is appreciated that clips or other securement structures could be used without departing from the broad aspects of the present invention.

The electronics dock 50 further has a lock 100. The lock 100 has an actuator 102. The actuator 102 has a knob 103. The lock 100 further has an arm 104 with three fingers 105, 106 and 107 connected thereto. The arm 104 moves in a plane that is generally parallel to the top plane 35 under operation of the actuator 102.

A pivot 110 is further provided as is a pivot lock or retainer 111. The pivot retainer 111 has a side 112 with a screw 113.

A connecting port 130 is further provided for charging and/or communicating with an electronic device. The connecting port 130 has a first head 131 and a second head 132. A pivot hole 133 is provided. The pivot 110 is received within the pivot hole 133. The pivot hole is generally aligned in a direction that is generally parallel with the top plane 35 of the body top 30. The connecting port 130 is pivotable or rotatably about this axis. Head 131 could be shaped to connect with an Android brand device. Head 132 could be shaped to connect to an Apple brand device. Heads 131 and 132 are preferably offset by an angle generally between 90 and 100 degrees. In a preferred embodiment, the offset is about 97 degrees. In this regard, when head 132 is accessible, head 131 is housed within the body 20. Also, when head 131 is accessible, head 132 is rotated through the hole 71 in the back support 70 where it is out of the way of the user. In both scenarios, one head is accessible and the other is stowed. The angle of separation between the heads could be greater (example, 180 degree separation) or smaller without departing from the broad aspects of the present invention. Further, there could be more than two heads provided without departing from the broad aspects of the present invention.

The connecting port 130 can rotate freely when the lock is in the unlocked position. Yet, the port is locked when it is cradled by the fingers of the lock 100. Only one head is accessible at a time. The accessible head is preferably aligned generally parallel with the back support 70.

Figure 4:
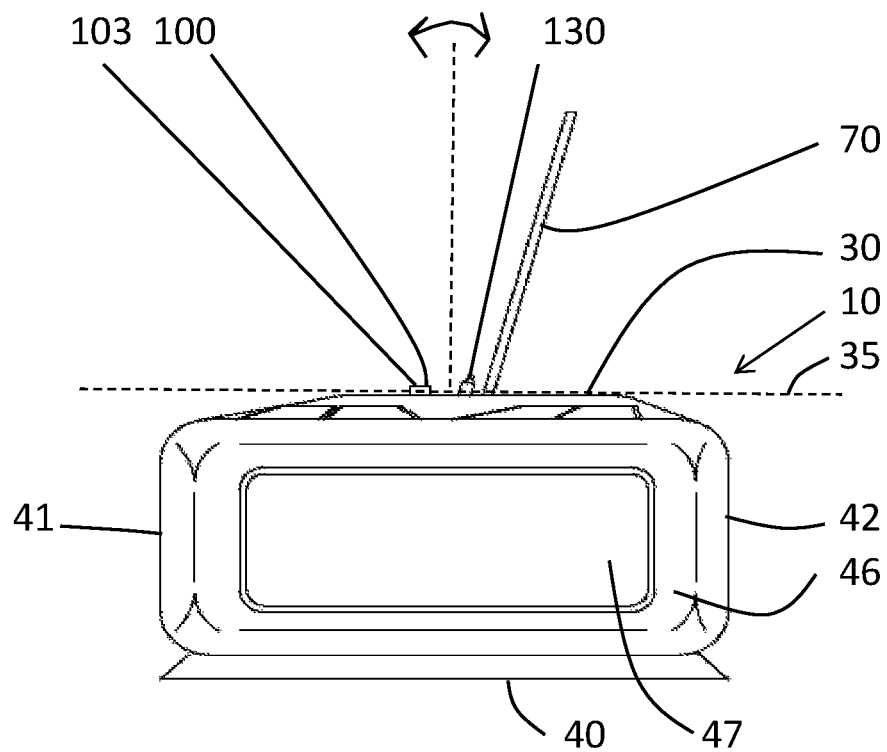
FIG. 4 is a side view of the preferred embodiment shown in FIG. 1.
Figure 4A:
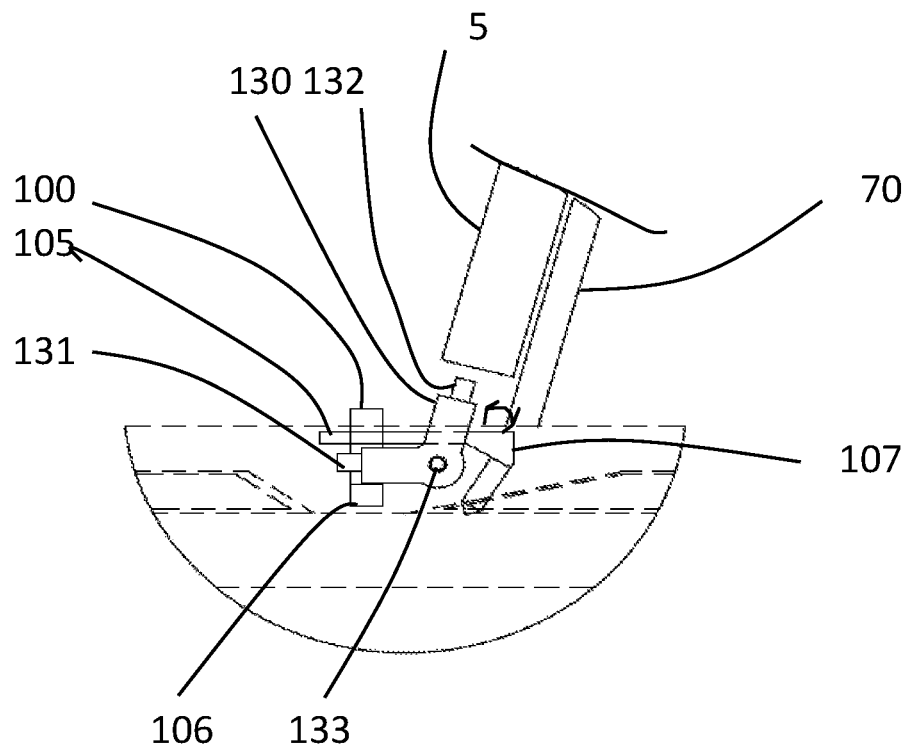
FIG. 4A is a close up exploded side view of a first connecting head in an accessible position.
Figure 4B:
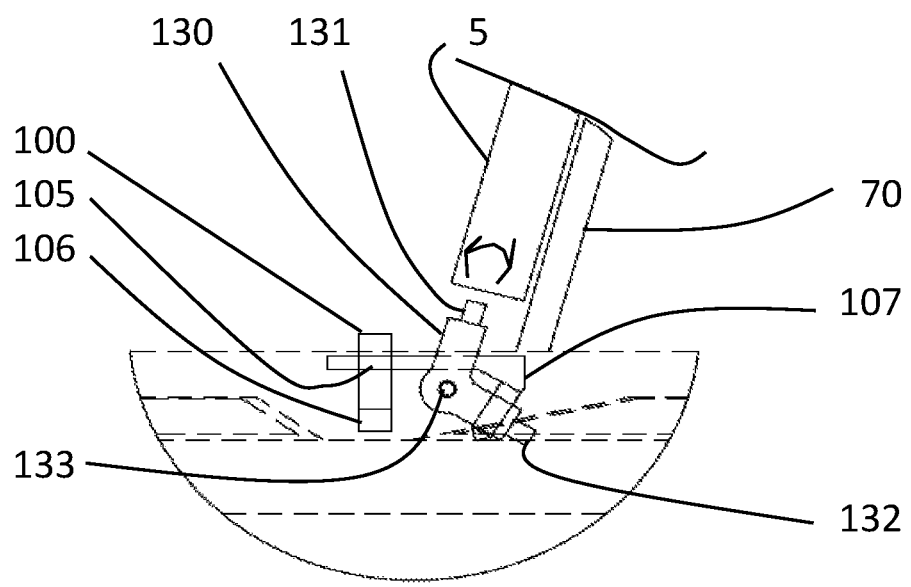
FIG. 4B is similar to FIG. 4A, but instead illustrates a second connecting head in an accessible position.
Figure 5:
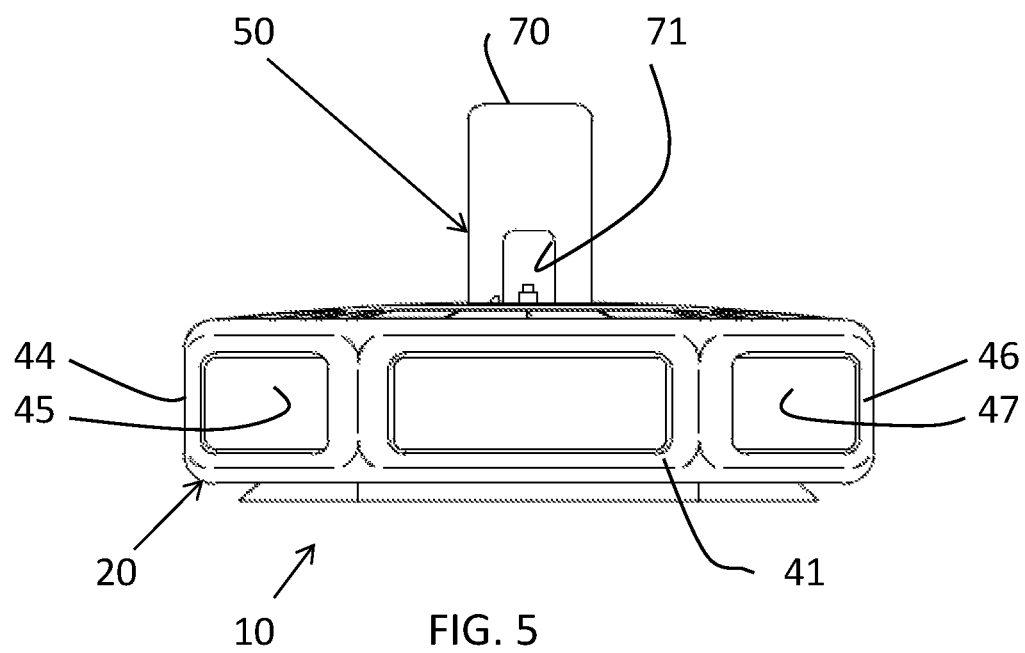
FIG. 5 is a front view of a preferred embodiment of the present invention.
Figure 6:
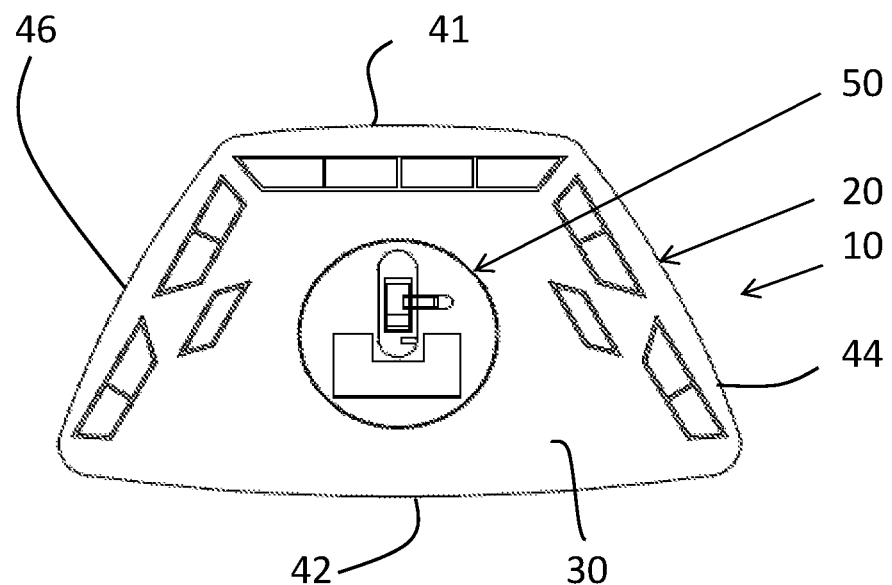
FIG. 6 is a top view of a preferred embodiment of the present invention.
Figure 7:
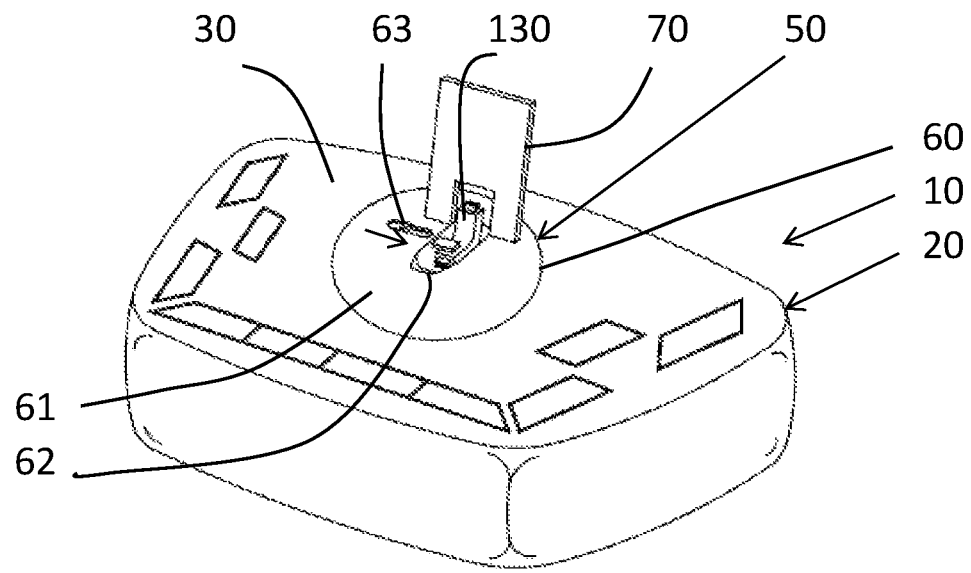
FIG. 7 is a perspective view of a preferred embodiment of the present invention showing a first connecting head in an accessible position.
Figure 7A:
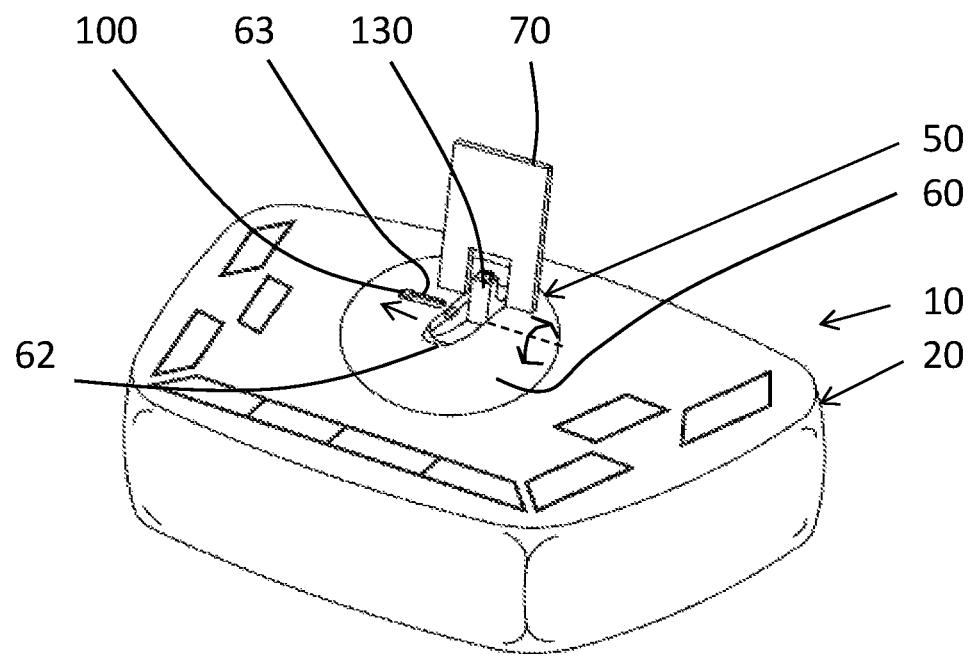
FIG. 7A is similar to FIG. 7, but shows the second connecting head in an accessible position.
Figure 7B:
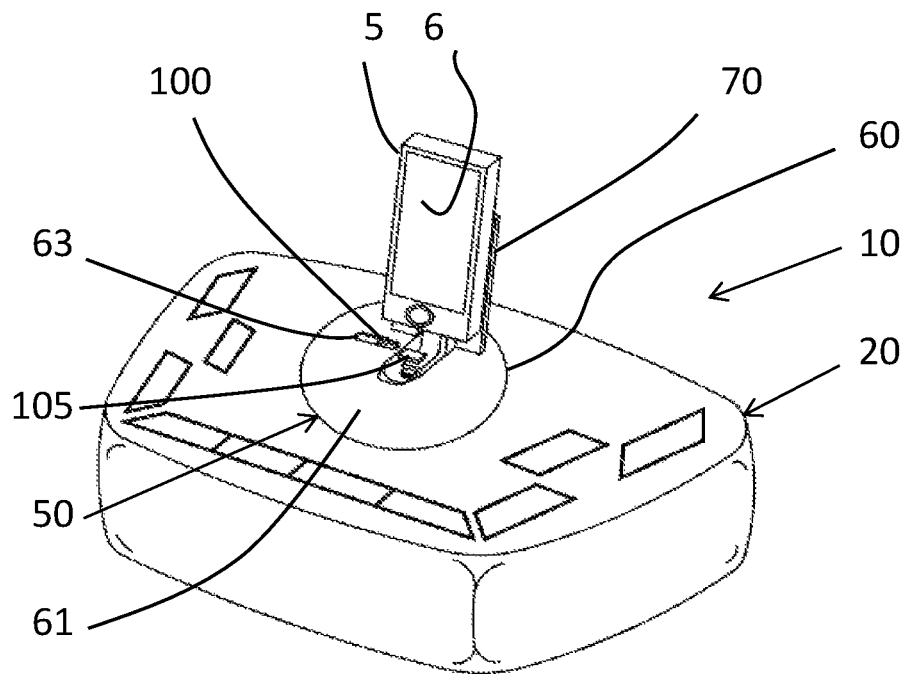
FIG. 7B is similar to FIG. 7, but shows a first type of electronic device in a docked position.
Figure 7C:
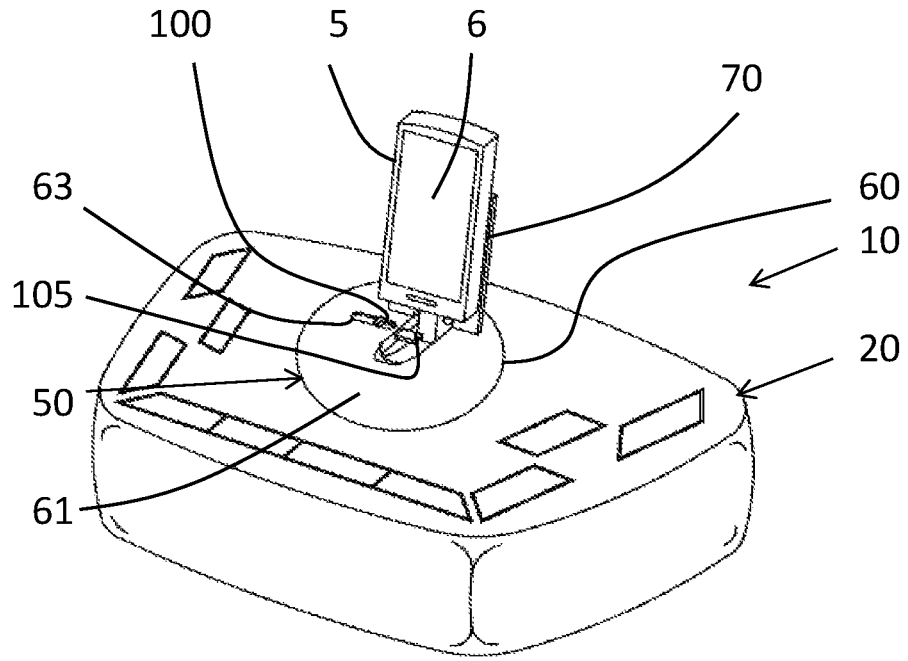
FIG. 7C is similar to FIG. 7A, but shows a second type of electronic device in a docked position.
Figure 8:
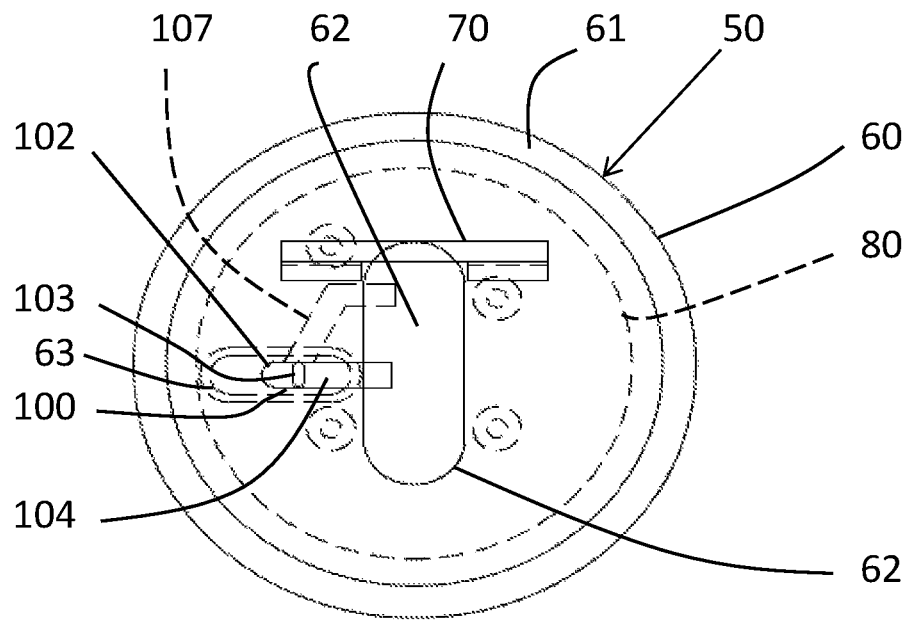
FIG. 8 is a top view of a preferred embodiment of an electronics dock.
Figure 8A:
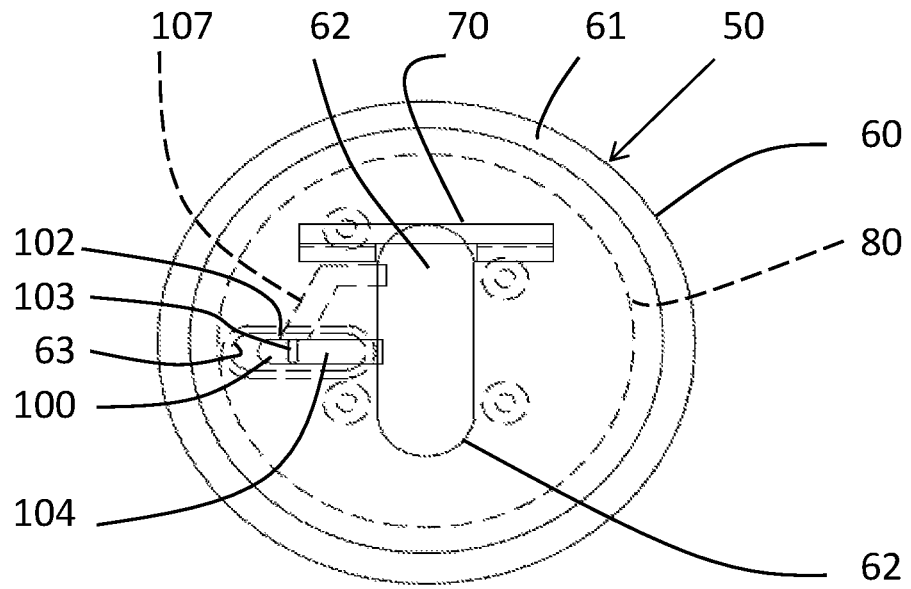
FIG. 8A is similar to FIG. 8, but shows a lock in an unlocked position.

Looking at FIG. 4A, it is seen that fingers 105 and 106 cradle head 131 when head 132 is accessible. Now, looking at FIG. 4B, it is seen that finger 107 cradles head 132 when head 131 is accessible.

The electronics dock 50 is twistable or rotatable relative to the body top 30. In this regard, the electronic device 5 that is connected to the connecting port 130 is viewable from a user selected viewing angle without moving the body 20 of the clock 10.

While a preferred embodiment of a body 20 is illustrated herein, it is understood that the principals of the present invention are applicable in bodies having more or fewer displays, or even without any displays, without departing from the broad aspects of the present invention.

It is understood that in an alternative embodiment, that the dock or base could alternatively be located other than on the top of the body. Instead, the base could be located on a ledge or platform extending from the side or end of the body adjacent or near the bottom. In such an alternative embodiment, it is preferred that the electronics dock can twist in a plane generally parallel to horizontal about an axis that is generally perpendicular to horizontal.

It is also understood that the advantages of using twistable display base can be distinct from the advantages of using a rotatable or toggling connecting port. This could be of advantage if a wireless communication or charging method if utilized.

Turning now to FIGS. 17-21, it is seen that an alternative embodiment of the present invention is illustrated. An alternative connecting port 230 is illustrated having heads 231, 232 and 233, respectively. Head 231 is preferably generally offset from head 232 about 90 degrees. Head 233 is preferably generally offset from head 232 about 90 degrees. A pivot hole 234 upon which the port rotates is also provided. It is seen that the port 230 can rotate in a plane generally parallel with the plane of the back support. Two of the heads can be made for a device wherein the device is not uniform is placement of the device. In this regard, the appropriate head could be selected whereby the face of the connected device could face away from the back support. It is appreciated that three heads is just one alternative and that more heads could be provided without departing from the broad aspects of the present invention.

Figure 22:
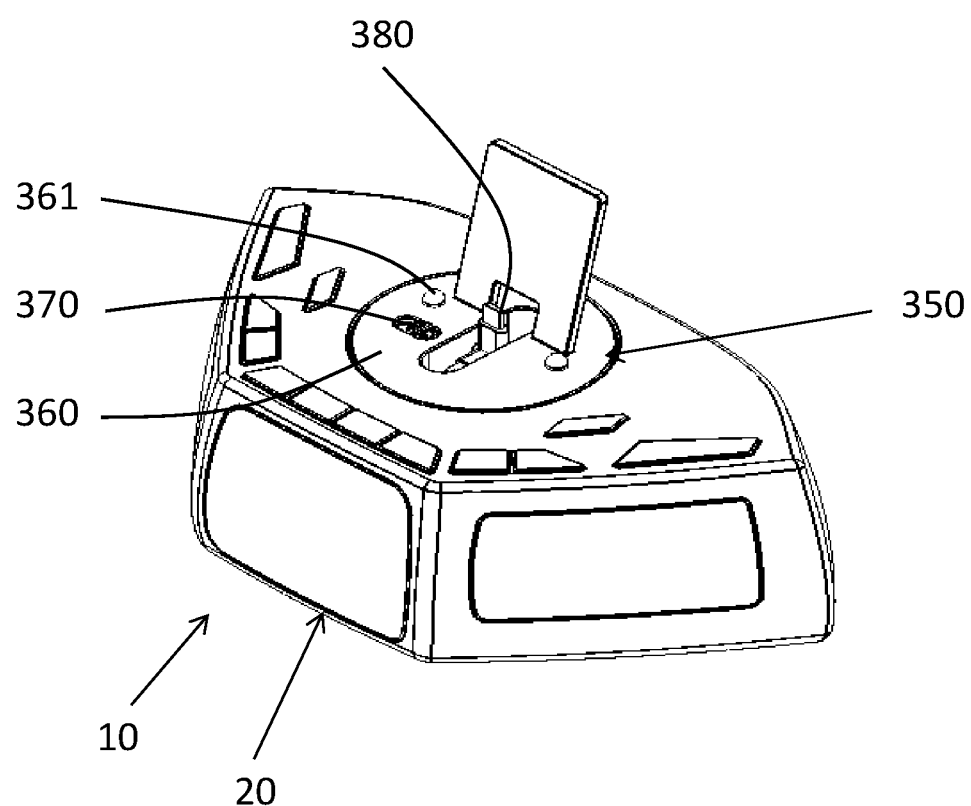
FIG. 22 is a perspective view of an alternative embodiment of the present invention including resting pads for an electronic device.

Turning now to FIG. 22, it is seen that an alternative embodiment of the present invention is illustrated. An electronics dock 350 having a base 360 with pads 361, a lock 370 and a connecting port 380 is provided. There are preferably two pads 361, one on each side of a charger opening. The pads are each preferably equidistant in front of a back and are useful for supporting the base of an electronic device seated on the charging port.

Turning now to FIGS. 23-32, it is seen that a further preferred embodiment of an electronics dock 450 is provided. The dock 450 has a base 460, a lock 500, a connecting port 530 and a switch 540. Each of these components is described below.

The base 460 has a surface 461 with several openings there through. Specifically, the surface 461 has a charger or connector opening 462 generally on the center of the surface. A lock opening 463 and a switch opening 464 also are provided. A back 470 upstands from the surface 460. The back 470 has a back opening 471 there through. The back opening 471 is at the bottom of the back and is aligned with the charger opening 462 through the surface 460. Two pads 480 are provided. The pads 480 extend upwards from the surface 460. There are preferably two pads, one of each being equally distant from and on opposite side of the charger opening. The pads 480 are also equally spaced from the back 470. The pads are preferably stationarily secured to the surface and are provided for the bottom of an electronic device to rest on.

Lock 500 has a plunger 510. The plunger 510 has a spring 511. Lock 500 further has a bar 520 having an arm 521 at one end and a tooth 522 at the opposing end. The arm 521 and tooth 522 are fixed positions in relation to the bar 520. The bar 520 is rotatable along an axis that is generally parallel to the surface of the base 560, and is supported a fixed distance from the bottom of the base. Plunger 510 can be depressed wherein it contacts the arm 521. Movement of the arm causes the bar 520 to rotate, and likewise causes the tooth 522 to rotate about the bar axis.

The connecting port 530 has two heads 531 and 532, respectively, and a pivot 533. The heads 531 and 532 are in fixed positions relative to each other, and both, respectively pivot at the same time about the pivot 533 about a pivot axis. Heads 531 and 532 are preferably sized and configured for two different types, brands or sizes of electronic devices.

The switch 540 is used to position the selected head 531 or 532 in position whereby an electronic device can be docked or connected to the dock. The switch 540 has a toggle 541 that can be selectively moved between two positions within the switch opening 564 through the surface 561 of the base 560. Movement of the toggle 541 causes gears 542 and 543 to turn. Gear 543 is connected to the connecting port along the pivot axis of the connecting port. Hence, movement of the toggle causes the head to rotate. It is appreciated that gears 542 and 543 rotate in opposite rotational directions. In this regard, moving the switch in one direction causes the connection port to move in the opposite rotational direction. It is understood that the movements could be made to move in the same directions by adding a gear or other type of device without departing from the broad aspects of the present invention.

Figure 23:
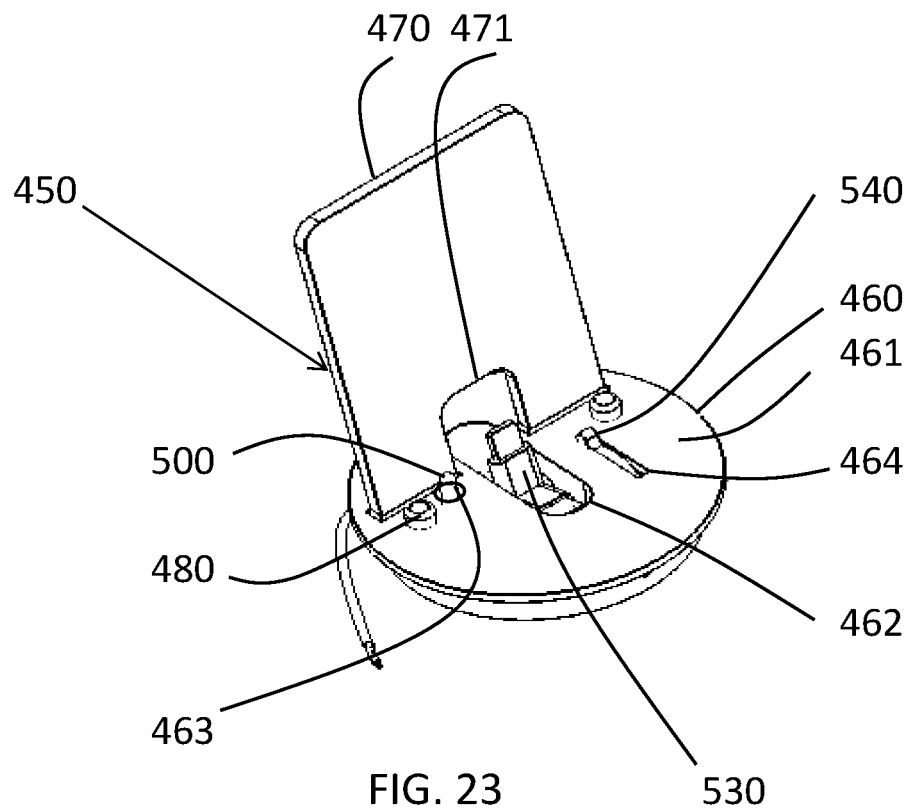
FIG. 23 is a perspective view of an alternative embodiment of the present invention.
Figure 24:
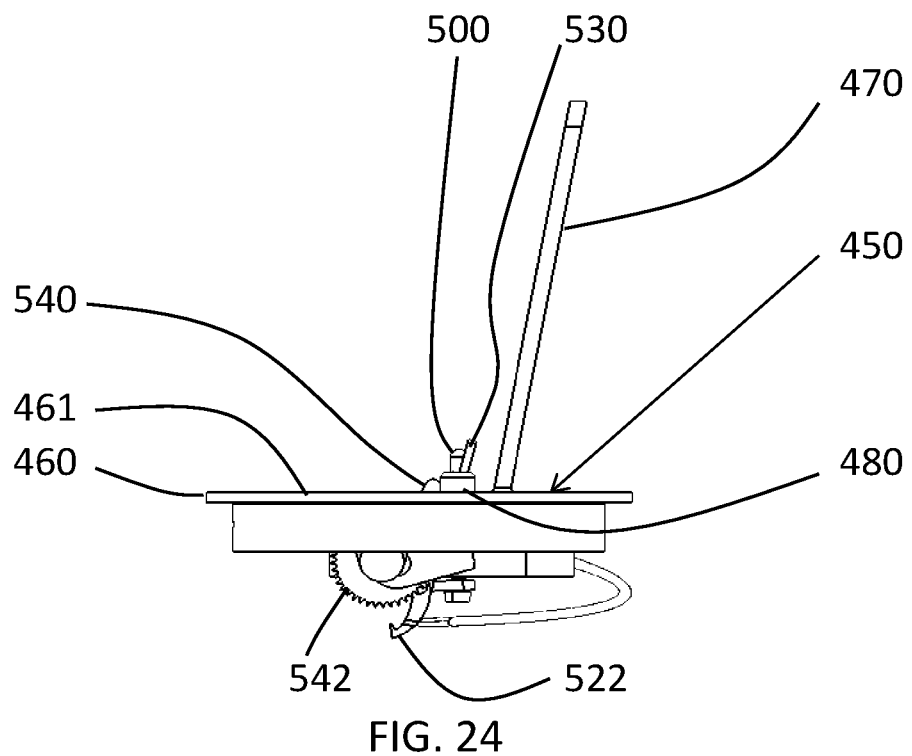
FIG. 24 is a side view of the embodiment illustrated in FIG. 23.
Figure 25:
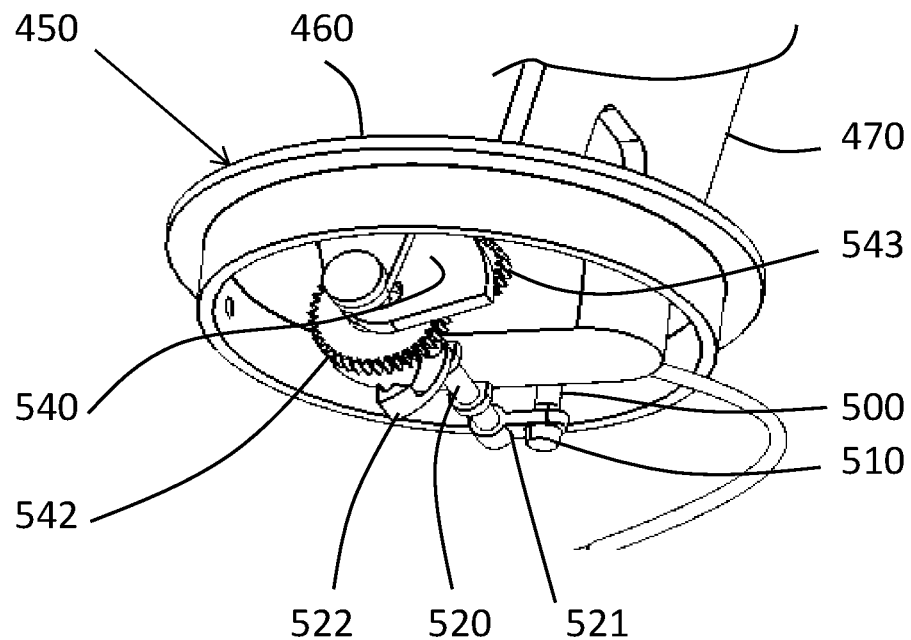
FIG. 25 is an alternative perspective view of the embodiment illustrated in FIG. 23.
Figure 26:
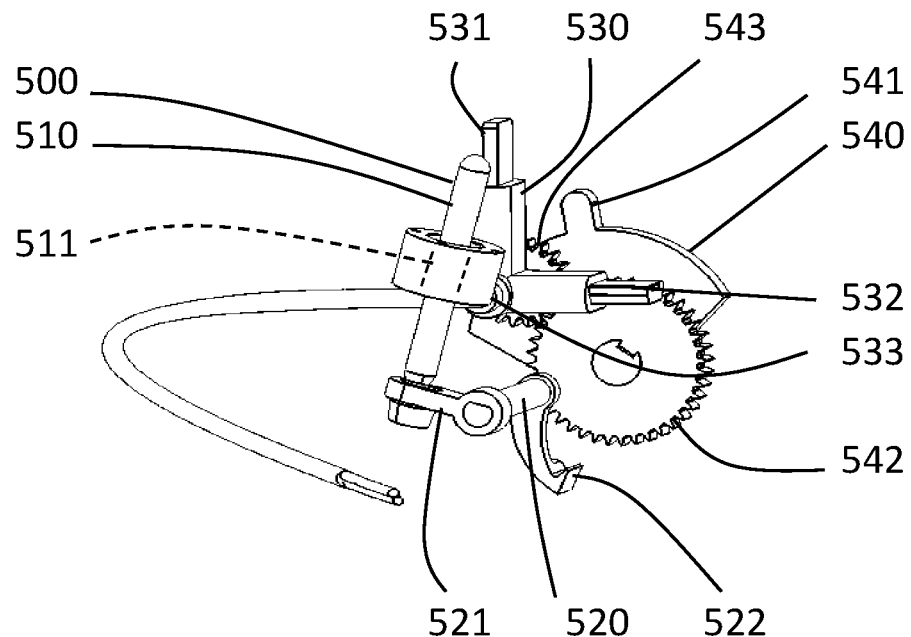
FIG. 26 is an isolation view of the connecting port, the lock and the switch of the embodiment illustrated in FIG. 23.
Figure 27:
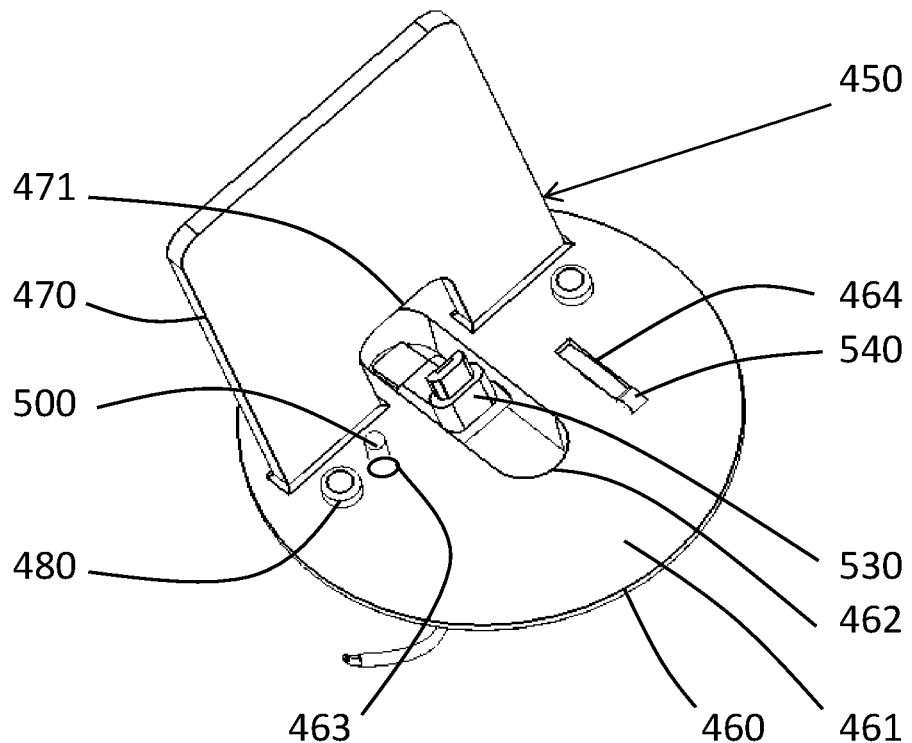
FIG. 27 is similar to FIG. 26, but shows the connecting port in an alternative orientation wherein a second head is accessible.
Figure 28:
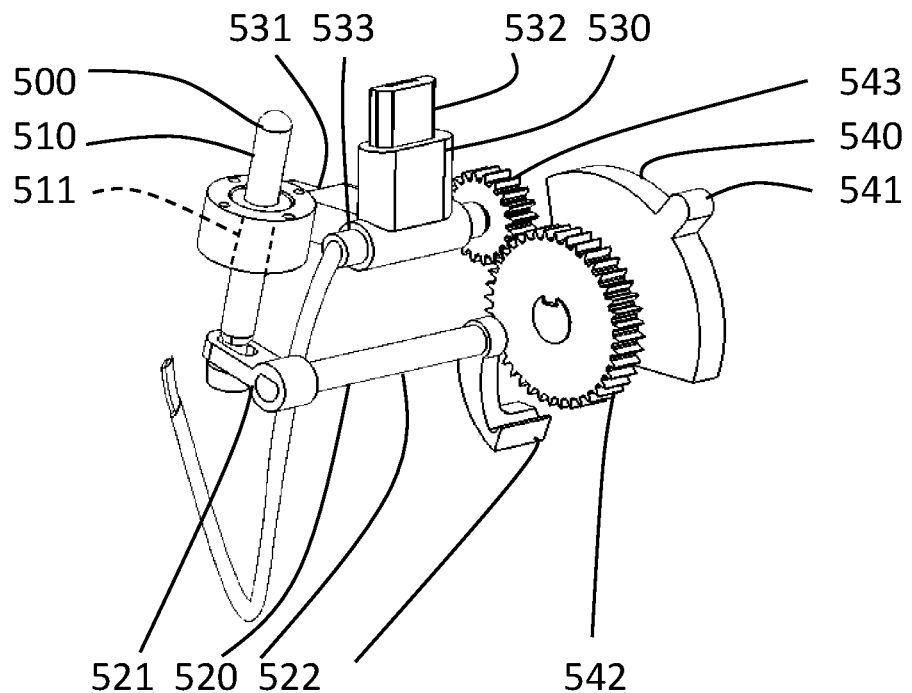
FIG. 28 is an isolation view of the connecting port, the lock and the switch of the embodiment illustrated in FIG. 27.
Figure 29:
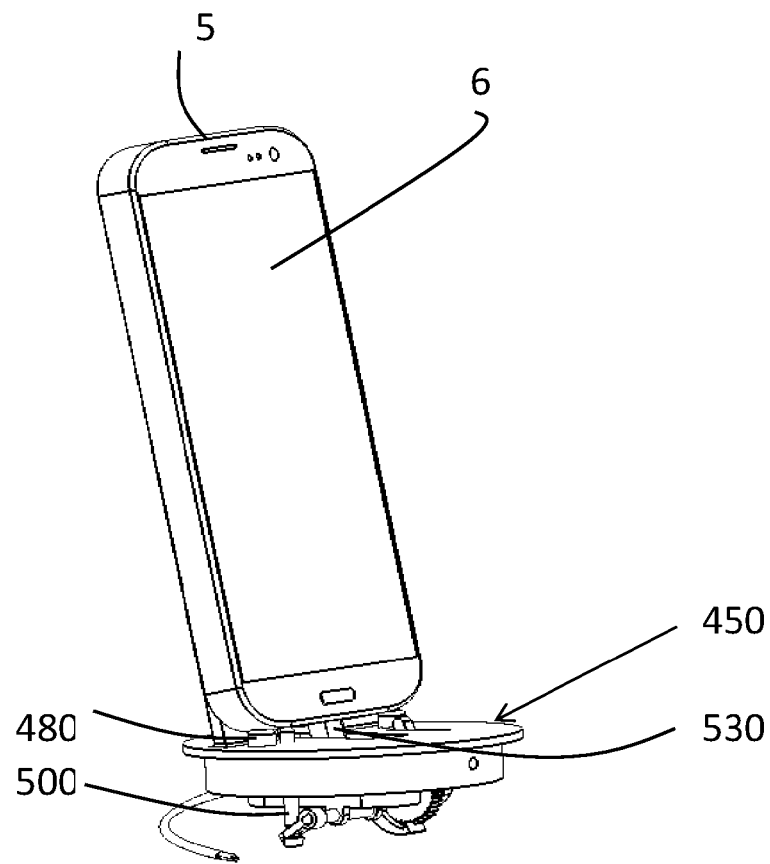
FIG. 29 is a view of the embodiment illustrated in FIG. 23, but with an electronic device docked and shown in the locked position.
Figure 30:
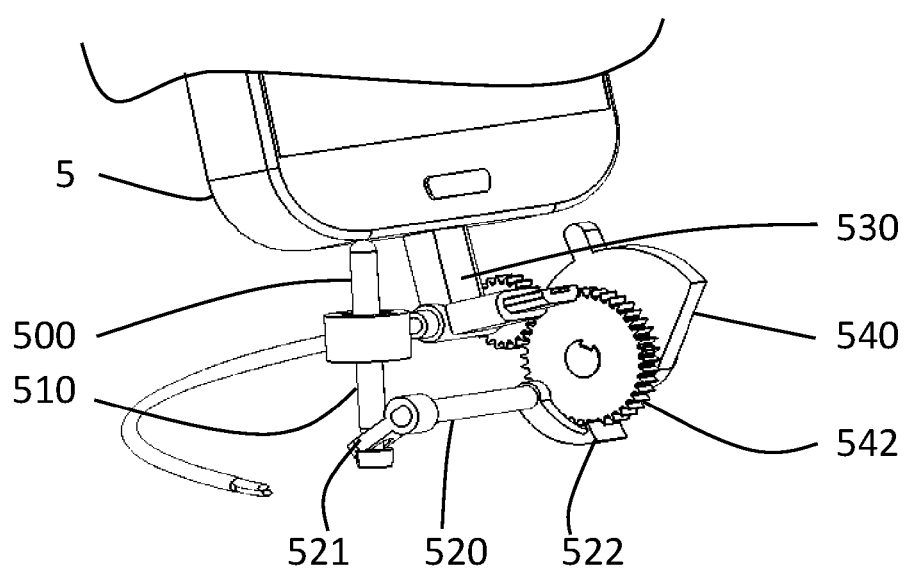
FIG. 30 is an isolation view of the connecting port, the lock and the switch of the embodiment illustrated in FIG. 29.
Figure 31:
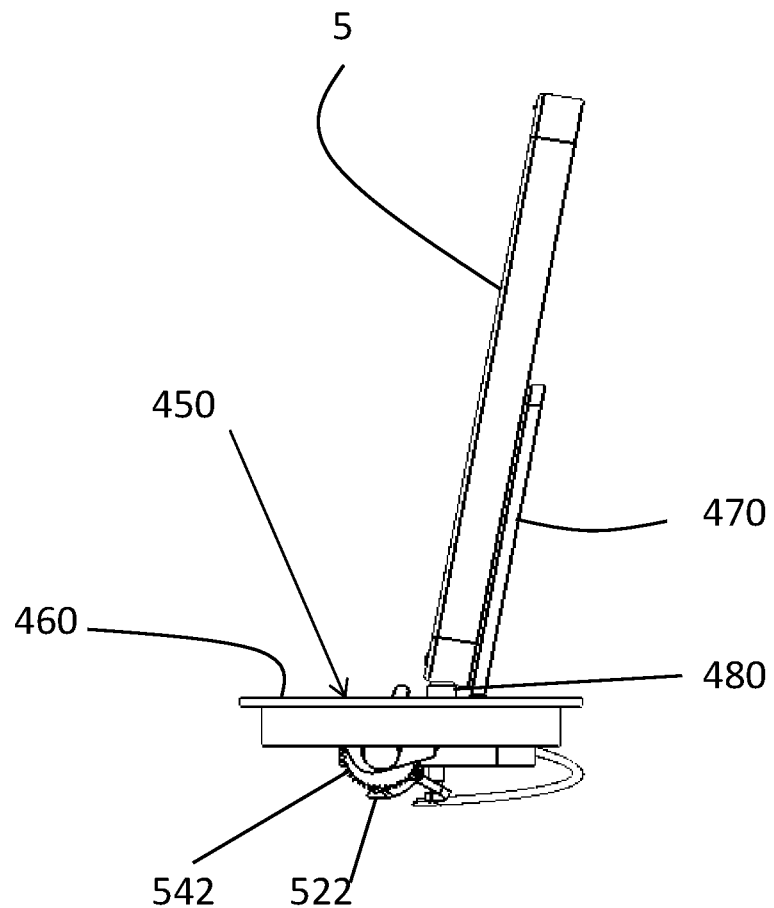
FIG. 31 is a side view of the embodiment illustrated in FIG. 29.
Figure 32:
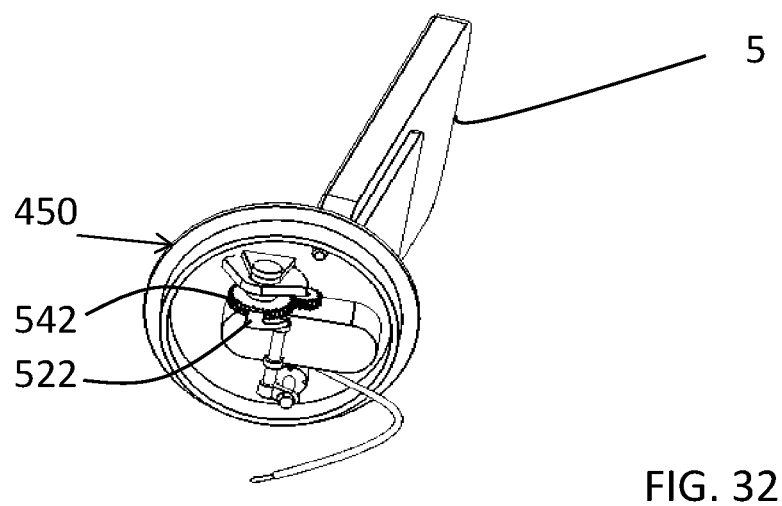
FIG. 32 is an alternative perspective view of the embodiment illustrated in FIG. 29.

Comparing FIGS. 23 and 27, it is seen how each of the two heads 531 and 532 are selectably deployed. The user can freely move the heads when an electronic device is not docked. Yet, the dock automatically locks when a device is docked in the electronics dock 450. The device is shown locked in FIGS. 29-32. In this regard, the plunger is depressed, causing the bar to rotate. The tooth 522 likewise is rotated until it contacts a gear tooth in gear 542. Locking gear 542 also locks gear 543, which in turn holds the head in the selected position as the connecting port cannot rotate. Holding the head in position prevents the head from moving thereby preventing damage to both the electronic dock and the electronic device. The electronic device rests on the pads 480. The dock automatically unlocks when the electronic device is removed from the dock, as the spring 511 biases the plunger to its biased (unlocked) position.

Turning now to FIGS. 33-41, it is seen that a further embodiment of an electronics dock 550 is provided. The dock 550 has a base 560, a lock 600, a connecting port 640 and a switch 650. Each of these components is described below.

The base 560 has a surface 561 with several openings there through. Specifically, the surface 561 has a charger opening 562 generally on the center of the surface. A lock opening 563 and a switch opening 564 also are provided. A back 570 upstands from the surface 560. The back 570 has a back opening 571 there through. The back opening 571 is at the bottom of the back and is aligned with the charger opening 562 through the surface 560. Two pads 580 are provided. The pads 580 extend upwards from the surface 560. There are preferably two pads, one of each being equally distant from and on opposite side of the charger opening. The pads 580 are also equally spaced from the back 570. The pads are preferably stationarily secured to the surface.

Lock 600 has a plunger 610. The plunger 610 has a shaft 611 with a shaft radius and a recess 612 with a recess radius. The recess radius is smaller than the shaft radius. A cuff 613 with an enlarged radius can be provided. A seat 620 is provided. A spring housing with a spring 621 is between the plunger 610 and the seat 620. The spring 621 biases the plunger upwards to an upper position. A plate 630 is further provided. The plate 630 has a linear slot 631 with a first oversized end 632 and an opposed second oversized end 633. The linear slot has a width that is slightly larger than the recess diameter of the plunger 610. The plunger diameter or cuff diameter is preferably slightly smaller than the diameter of both the first and second oversized ends 632 and 633, yet is larger than the width of the slot. In the preferred embodiment, the cuff 613 is held within either of the oversized slot ends 632 or 633 when the device is locked.

The plunger, in its biased position, has its recess 612 aligned with the slot 631 wherein the plate 630 can move relative to the plunger. Yet, when the plunger is depressed, it remains in either one of the oversized ends, and the plate cannot move relative to the plunger.

The connecting port 640 has two heads 641 and 642, respectively, and a pivot 643. The heads 641 and 642 are in fixed positions relative to each other, and both, respectively pivot at the same time about the pivot 643 about a pivot axis. Heads 641 and 642 are preferably sized and configured for two different types, brands or sizes of electronic devices. A lever 644 with a slot 645 extends away from the port 640 in an angle that is generally about 135 degrees from each of the heads.

The switch 650 has a toggle 651 and a translating member 652. The plate 630 of the lock 600 is fixed in position with the switch, and linearly moves as the switch 650 is moved within the switch opening 564. The translating member 652 moves within slot 645 as the connecting port is rotated about its axis.

Figure 33:
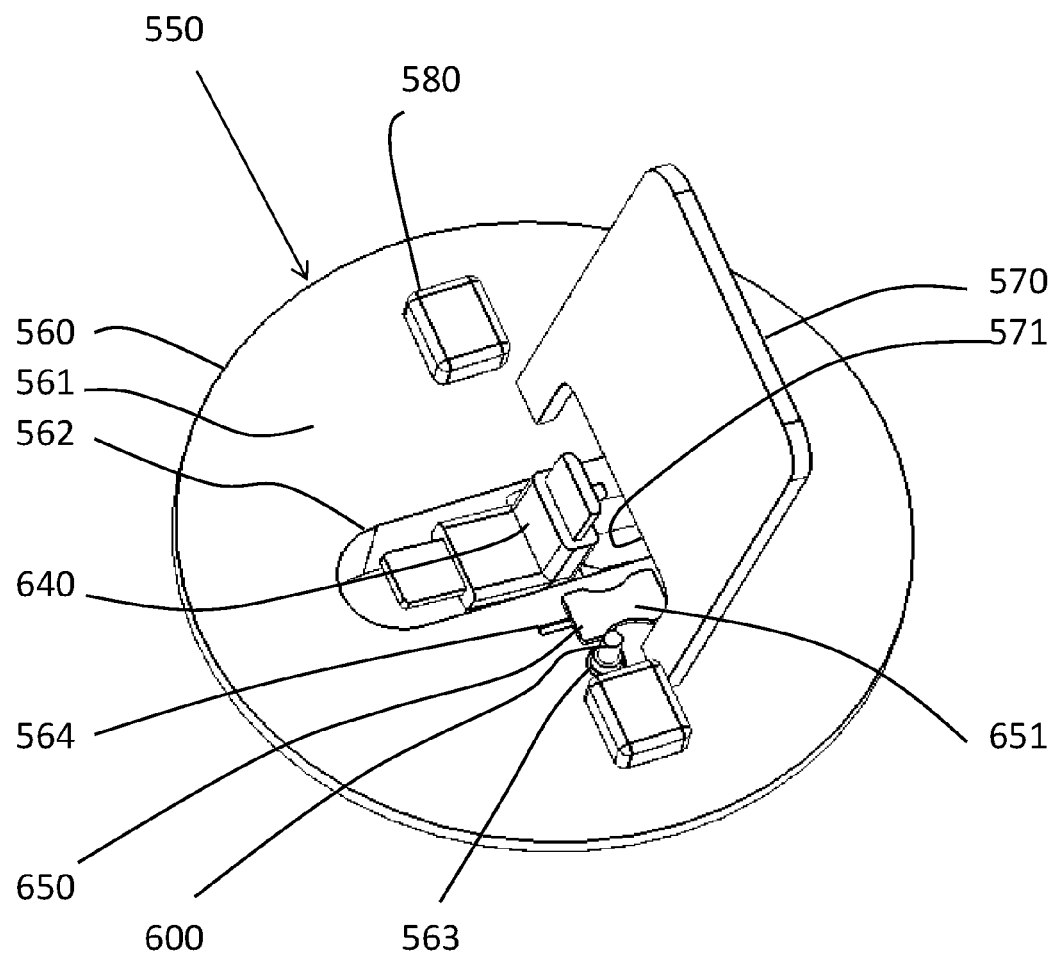
FIG. 33 is a perspective of an alternative embodiment of the present invention.
Figure 34:
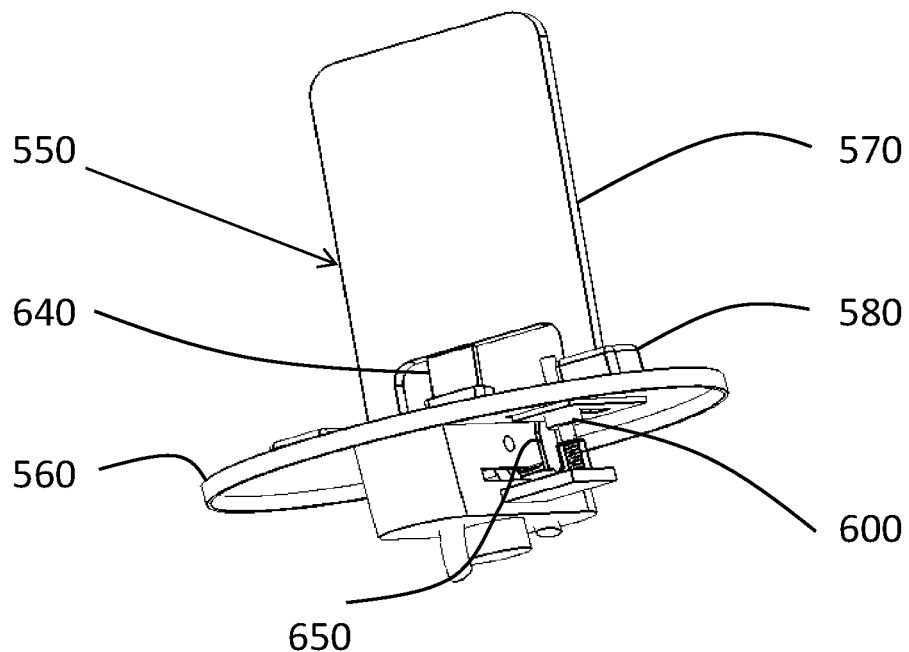
FIG. 34 is an alternative perspective view of the embodiment illustrated in FIG. 33.
Figure 35:
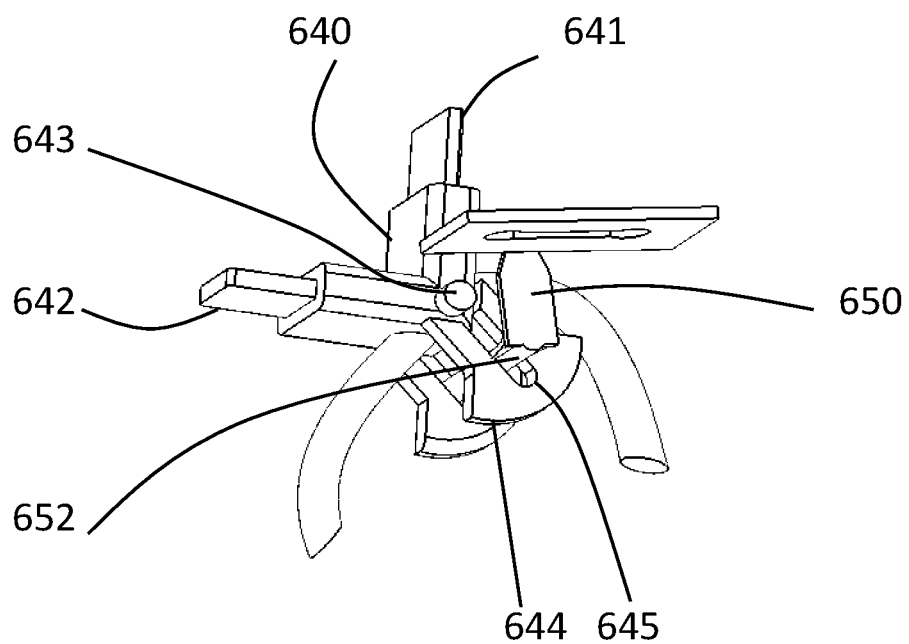
FIG. 35 is an isolation view of the connecting port and the switch of the embodiment illustrated in FIG. 33.
Figure 36:
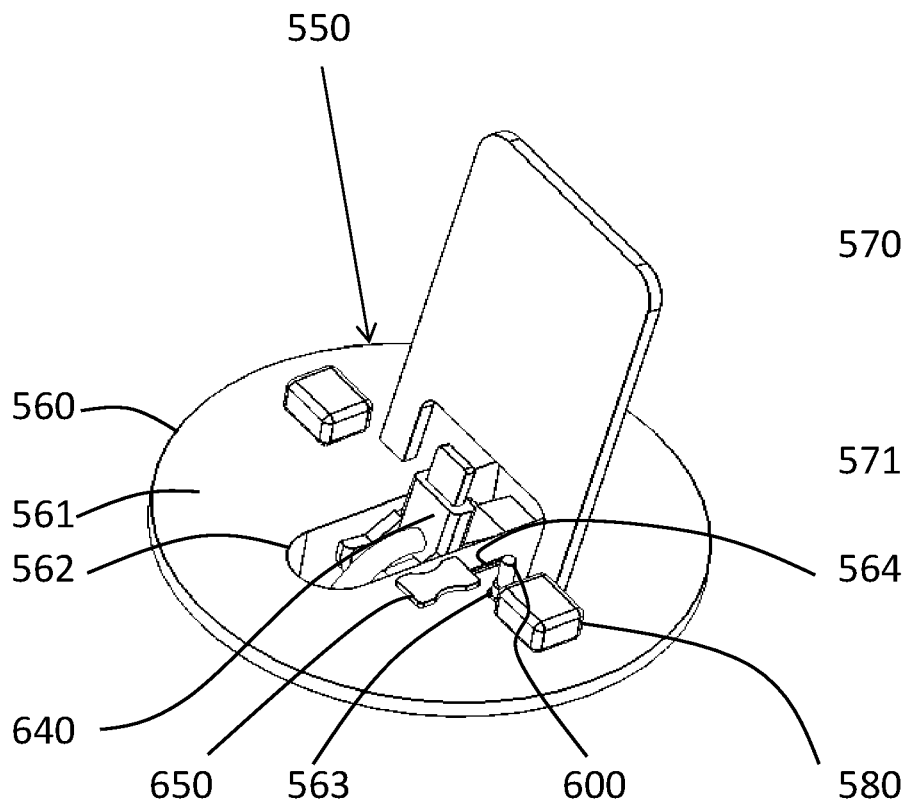
FIG. 36 is an alternative perspective view of the embodiment illustrated in FIG. 33 wherein the port is rotated to an alternative orientation.
Figure 37:
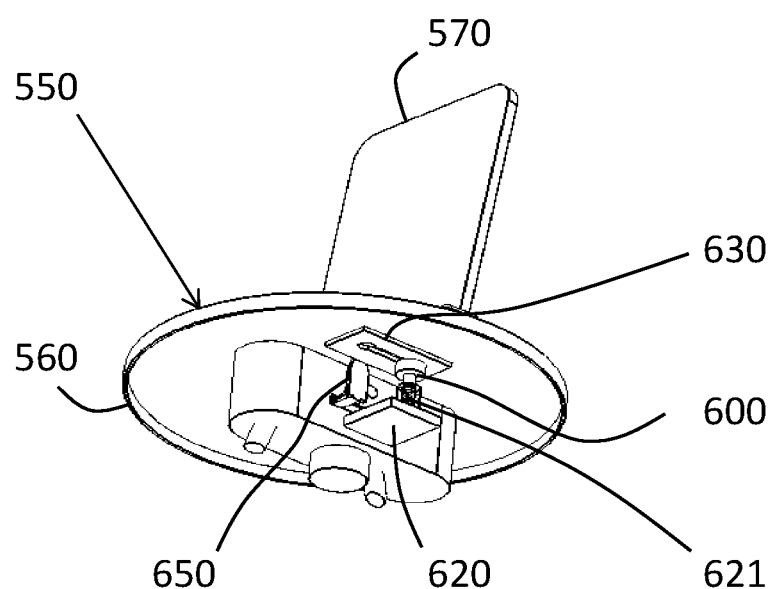
FIG. 37 is an alternative perspective view of the embodiment illustrated in FIG. 36.
Figure 38:
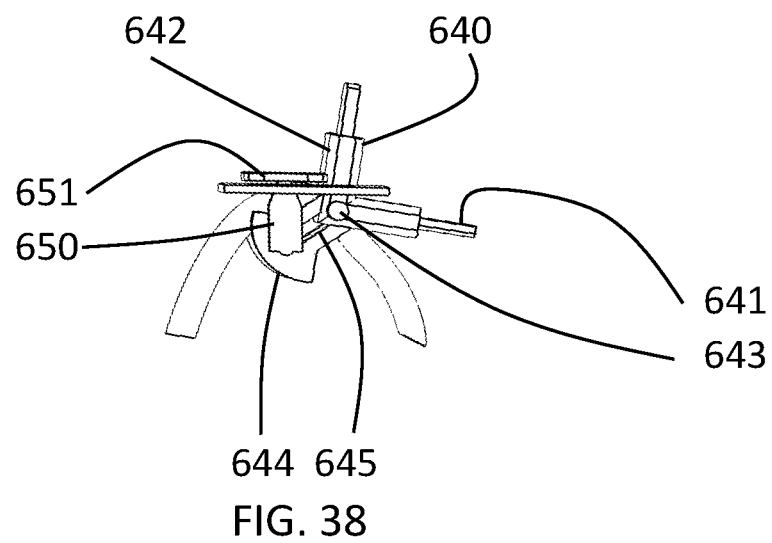
FIG. 38 is an isolation view of the connecting port and the switch of the embodiment illustrated in FIG. 36.
Figure 39:
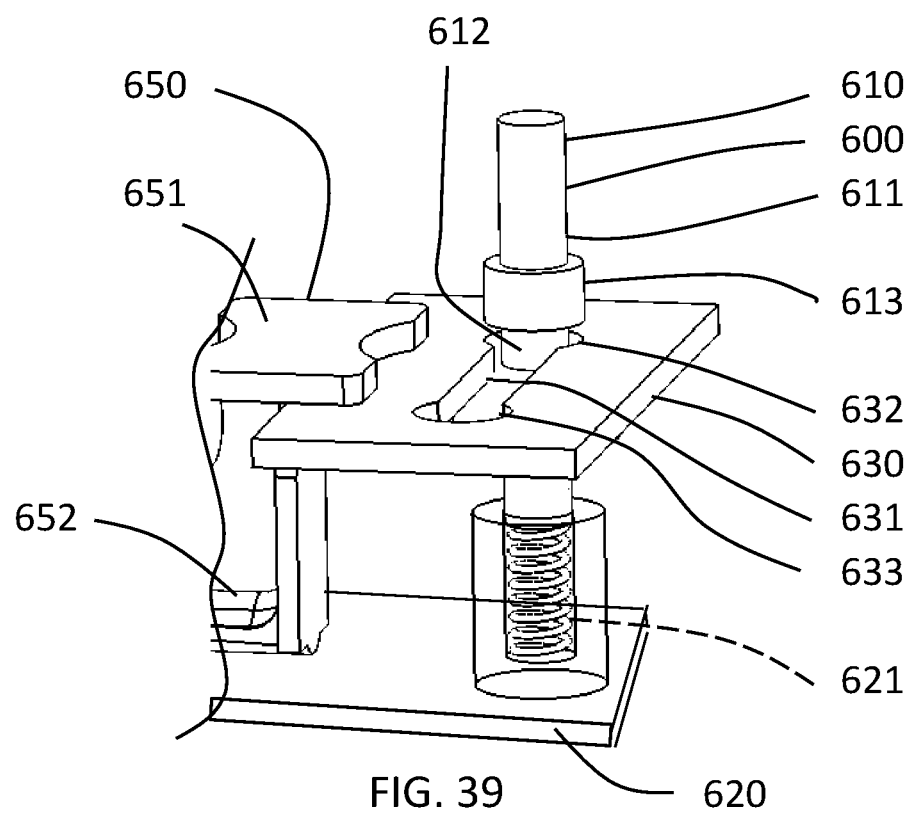
FIG. 39 is an isolation view of the lock of the embodiment illustrated in FIG. 33.
Figure 40:
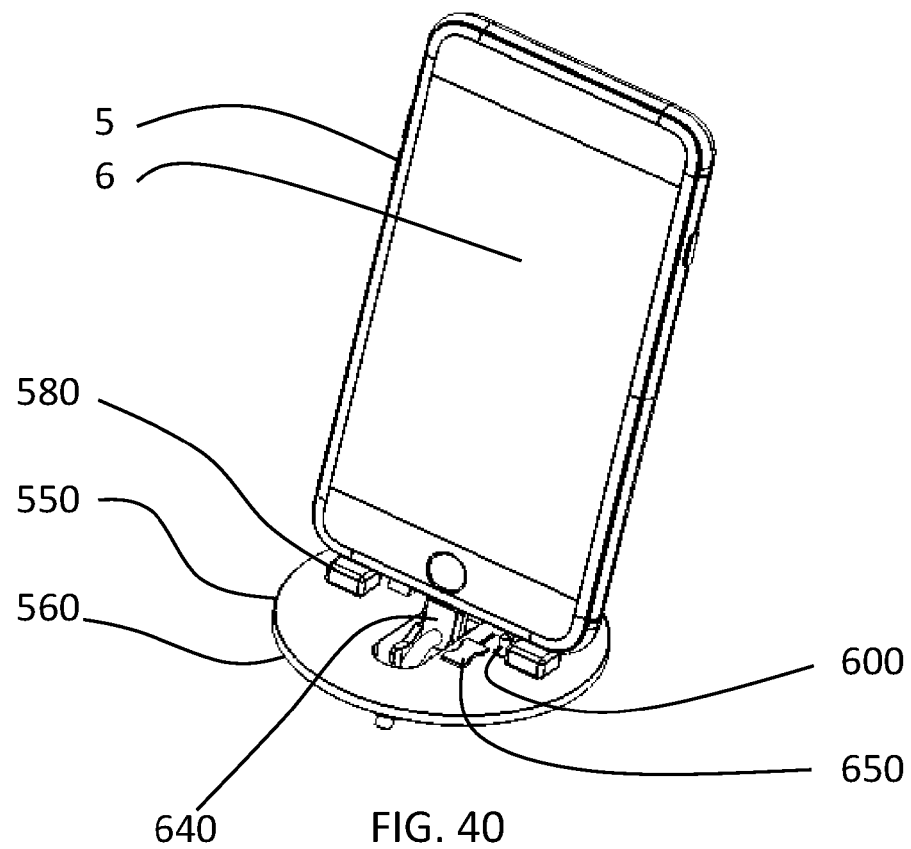
FIG. 40 is a perspective view of an electronic device being docked in the embodiment of FIG. 33.
Figure 41:
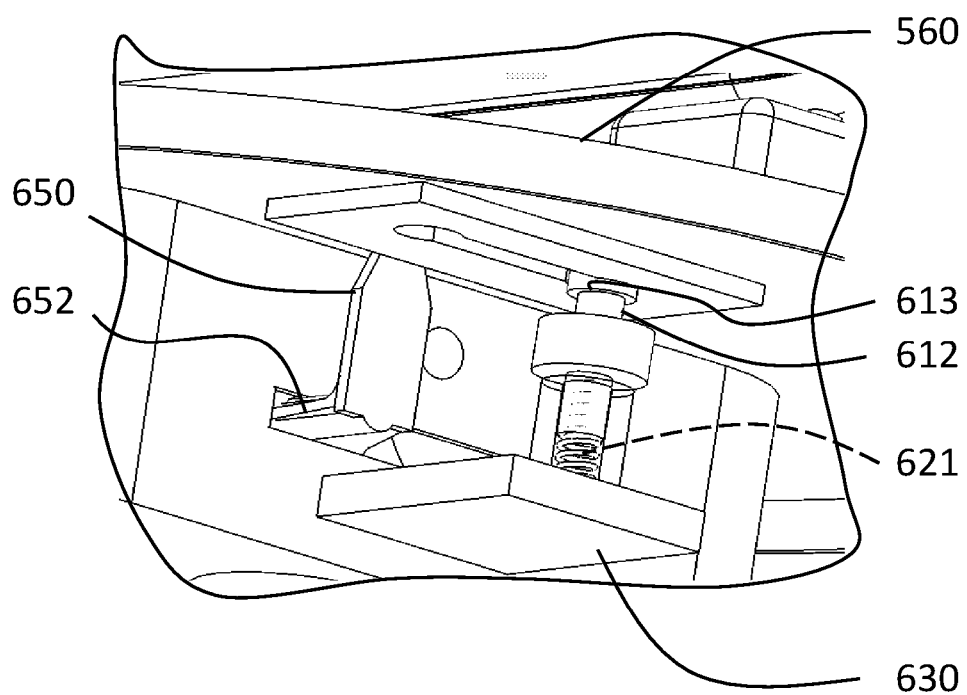
FIG. 41 is a close up view of the operation of the lock of the embodiment of FIG. 33.

Comparing FIGS. 33 and 36, it is seen how each of the two heads 641 and 642 are selectably deployed. The user can freely move the heads when an electronic device is not docked. Yet, the dock automatically locks when a device is docked in the electronics dock 550. The device is shown locked in FIGS. 40 and 41. In this regard, the plunger is depressed, causing the plunger to move further through the plate 630. Since the plate 630 is then prevented from movement, the switch 650 and connecting port 640 is likewise prevented from moving. Holding the head in position prevents the head from moving thereby preventing damage to both the electronic dock and the electronic device. The electronic device rests on the pads 580. The dock automatically unlocks when the electronic device is removed from the dock, as the spring 621 biases the plunger to its biased (unlocked) position.

Both docks 450 and 550 have rings or other structures that allow them to be secured to the body 20 in a rotatable manner. The axis of rotation between the docks and body is generally perpendicular to the axis of rotation of the respective connecting ports. Also, the docks are electrically connected to the body via a wire. Wireless data transmission is also possible.

It is appreciated that while a clock is shown as a preferred apparatus for use with an electronics dock, that alternatives such as a single display device, a speaker, a printer or other type of device could be used.

Thus it is apparent that there has been provided, in accordance with the invention, an apparatus that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An apparatus for use with an electronic device, said apparatus comprising:
   a body with a body plane; and
   an electronics dock on said body, said electronics dock having a surface and a back with a back plane for supporting the electronic device, said back being in a fixed position with respect to said surface and is upstanding from said surface, wherein said electronics dock is rotatable along an electronics dock axis that is generally perpendicular to said body plane, whereby a viewing angle of the electronic device is adjustable about said electronics dock axis, wherein said surface has a connector opening there through, said electronics dock having a connecting port extending through said connector opening, wherein said connecting port has a first head and a second head, and wherein said connecting port is rotatable about a pivot axis that is parallel to said back plane, whereby either of said first head or said second head can extend above said surface.

2. The apparatus of claim 1 wherein:
   said body has a first face with a first display;
   said body has a second face with a second display; and
   said first display and said second display being viewable from different angles.

3. The apparatus of claim 1 wherein said pivot axis is generally perpendicular to said electronics dock axis.

4. The apparatus of claim 1 wherein a first pad is located on a first side of said connector opening and a second pad is located on a second side of said connector opening.

5. The apparatus of claim 1 further comprising a lock, said lock locking a rotational position of said connecting port about said pivot axis to lock one of said first head and said second head in a position adjacent to said back, said back having a back opening therethrough wherein said first head passes through said back opening when said second head is positioned adjacent to said back.

6. The apparatus of claim 5 further comprising a switch.

7. The apparatus of claim 6 wherein said lock has a plunger, said plunger being biased to a first plunger position wherein said electronics device is unlocked, and is capable of being moved to a second plunger position wherein said lock locks said device.

8. The apparatus of claim 7 wherein said lock comprises a bar with an arm and a tooth, said tooth moving under operation of a plunger when said plunger is moved to said second plunger position so that said tooth engages a gear that is fixed in rotational orientation with said connecting port.

9. The apparatus of claim 7 wherein said lock comprises a plate with a slot, said slot having a first enlarged end and a second enlarged end, said plate being unmovable with respect to said plunger when said plunger is in said second plunger position.

10. An apparatus for use with an electronic device, said apparatus comprising:
    a body; and
    an electronics dock on said body having a surface and a back stationarily upstanding from said surface, said body having a body plane and said back having a back opening therethrough; said electronics dock having a connecting port with a first head and a second head,
    wherein said connecting port is rotatable about a pivot axis, said pivot axis being generally parallel to a back plane, said first head and said second head being selectably positionable adjacent to said back by rotating said connecting port, said first head passing through said back opening when said second head is in a position adjacent to said back.

11. The apparatus of claim 10 wherein said electronics dock is rotatable relative to said body about an electronics dock axis, said electronics dock axis being generally perpendicular to said pivot axis.

12. The apparatus of claim 10 further comprising a switch and a lock.

13. The apparatus of claim 12 wherein said lock has a plunger, said plunger being biased to a first plunger position wherein said electronics device is unlocked, and is capable of being moved to a second plunger position wherein said lock locks said device.

14. The apparatus of claim 13 wherein said lock comprises a bar with an arm and a tooth, said tooth moving under operation of a plunger when said plunger is moved to said second plunger position so that said tooth engages a gear that is fixed in a rotational orientation with respect to said connecting port.

15. The apparatus of claim 13 wherein said lock comprises a plate with a slot, said slot having a first enlarged end and a second enlarged end, said plate being unmovable with respect to said plunger when said plunger is in said second plunger position.

16. A clock for use with an electronic device, said clock comprising:
    a body with:
       a first face with a first face display; and
       a second face with a second face display; and
    an electronics dock having a base with a back having a back plane, said back plane having a back opening, and a connecting port, said connecting port having a first head and a second head,
    wherein:
       said electronics dock is rotatable relative to said body; and
       said connecting port is rotatable relative to said base to position one of said first head and said second head adjacent to said back for use with the electronic device, wherein said first head passes through said back opening when said second head is positioned adjacent to said back, wherein said connecting port is rotatable about a pivot axis that is parallel to said back plane, whereby either of said first head or said second head can extend above said surface.

* * * * *